Sept. 10, 1940. J. SCHMIDT 2,214,285
GREEN CORN CUTTING APPARATUS
Filed Feb. 11, 1939 9 Sheets-Sheet 2

Inventor:
John Schmidt
By Fred Gerlach
his Atty.

Sept. 10, 1940.  J. SCHMIDT  2,214,285
GREEN CORN CUTTING APPARATUS
Filed Feb. 11, 1939  9 Sheets-Sheet 3
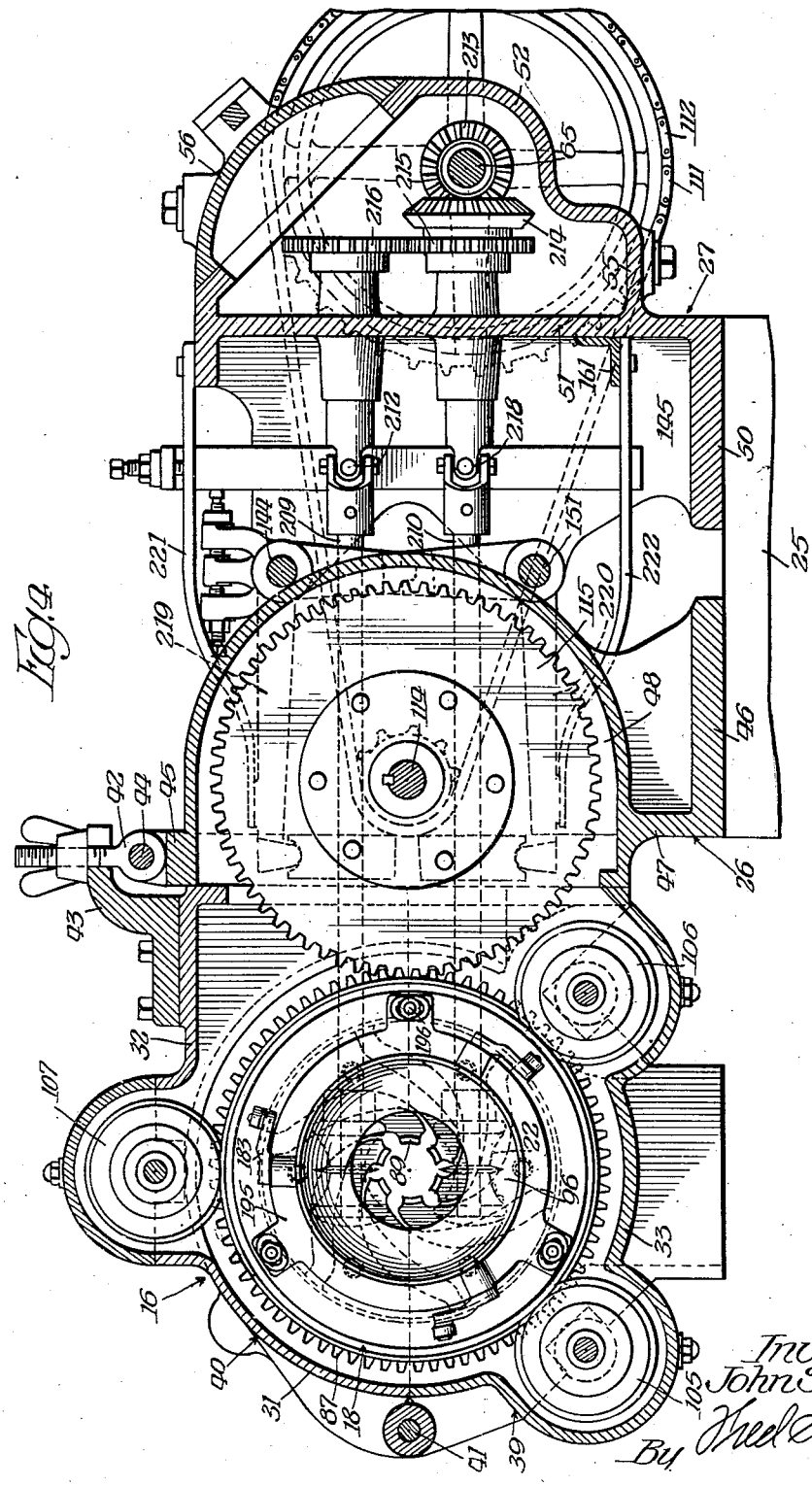
Inventor
John Schmidt
By Fred Gerlach
Atty

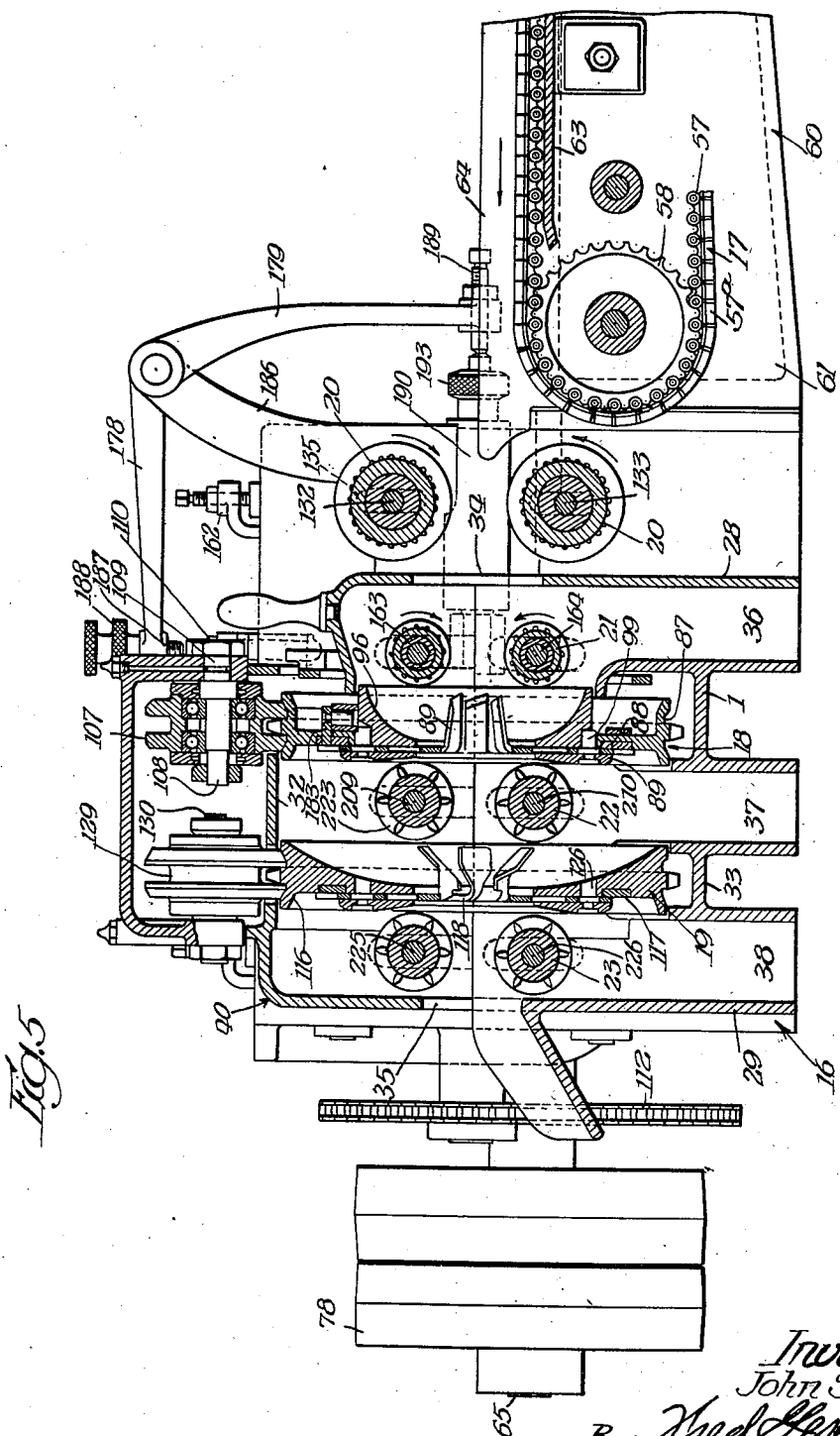

Sept. 10, 1940.       J. SCHMIDT       2,214,285
GREEN CORN CUTTING APPARATUS
Filed Feb. 11, 1939        9 Sheets-Sheet 5
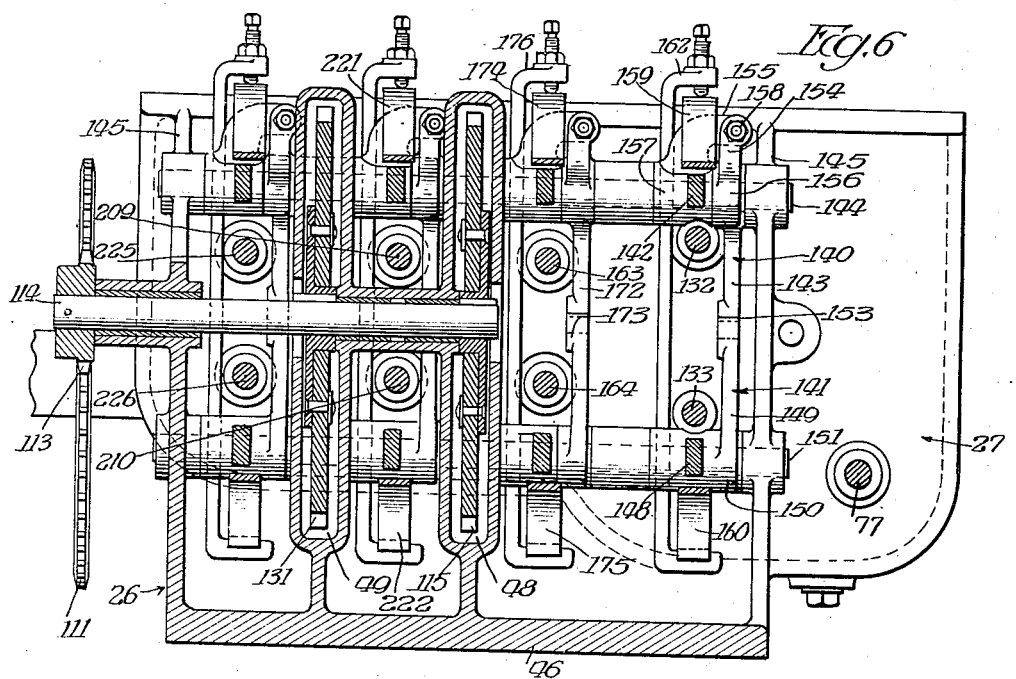
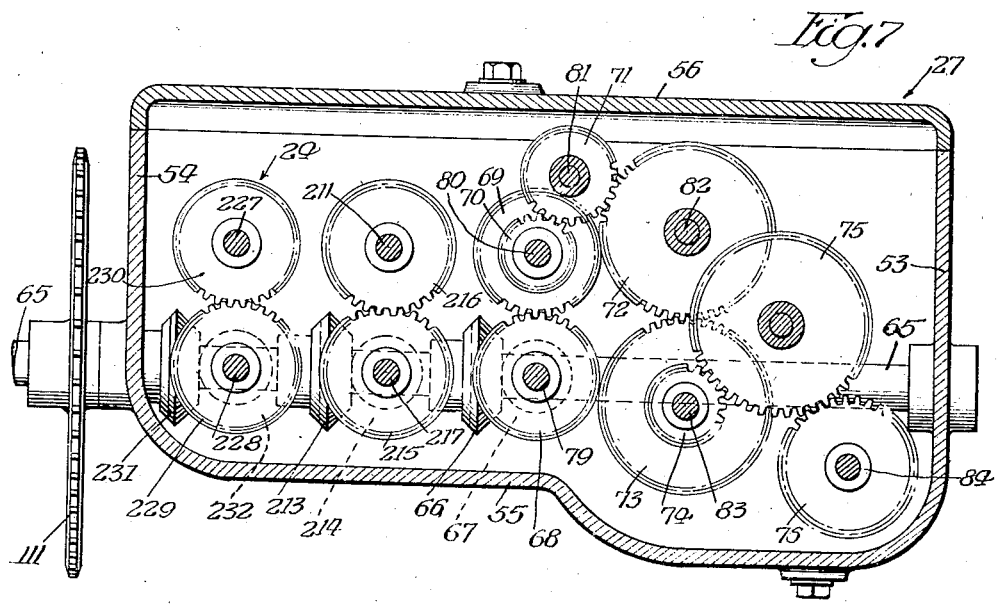
Inventor:
John Schmidt
By Thed Gerlach
his Atty

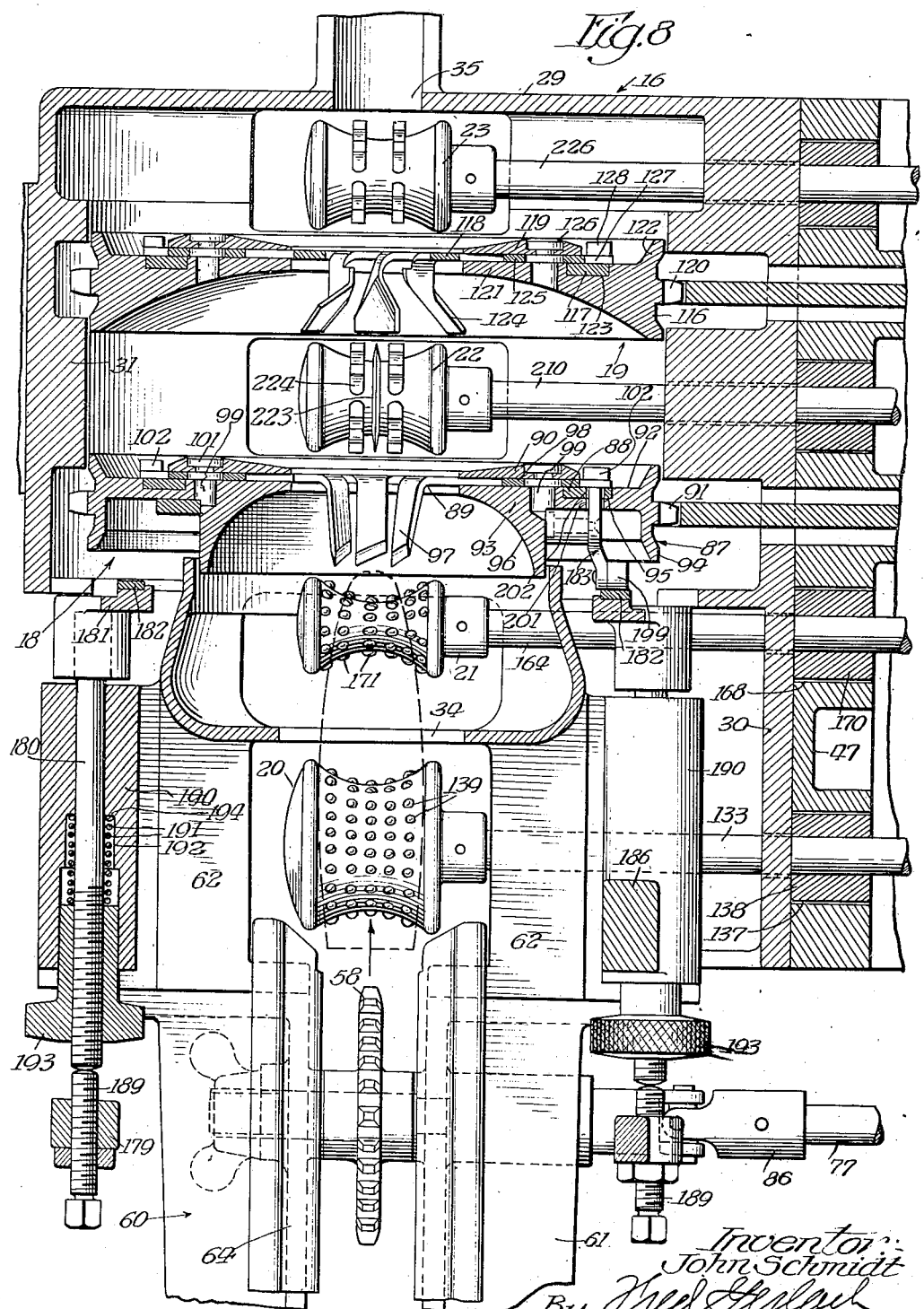

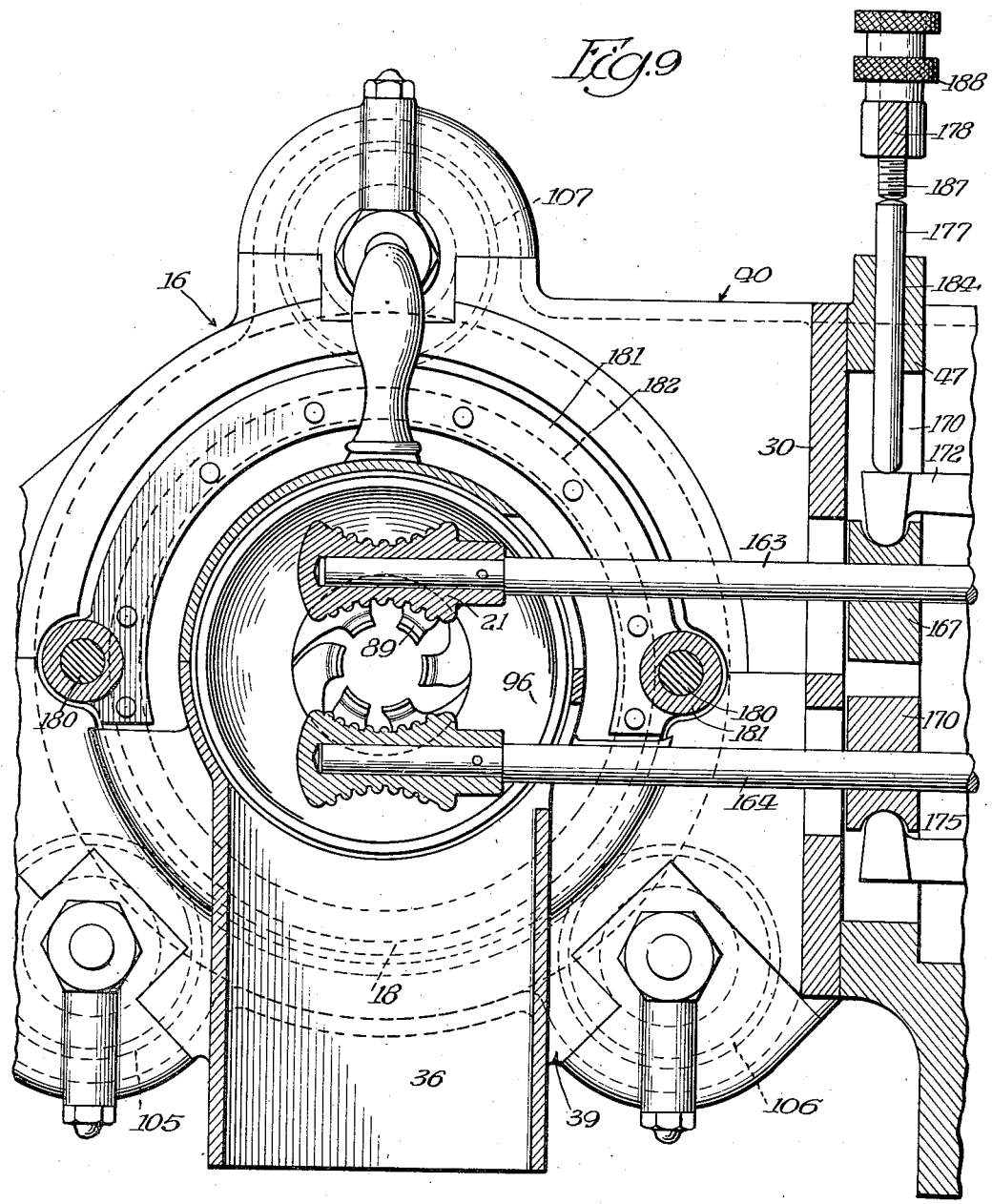

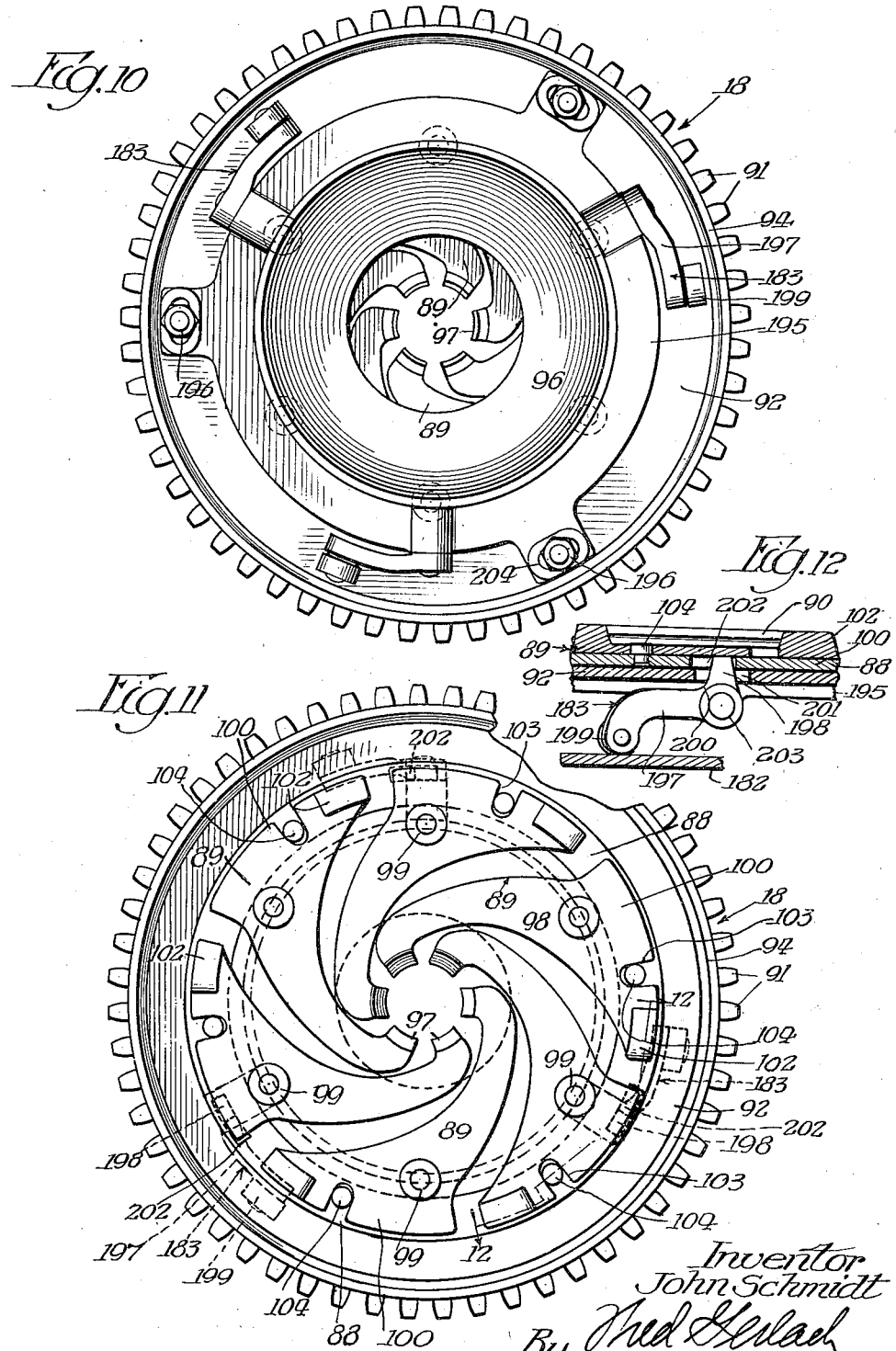

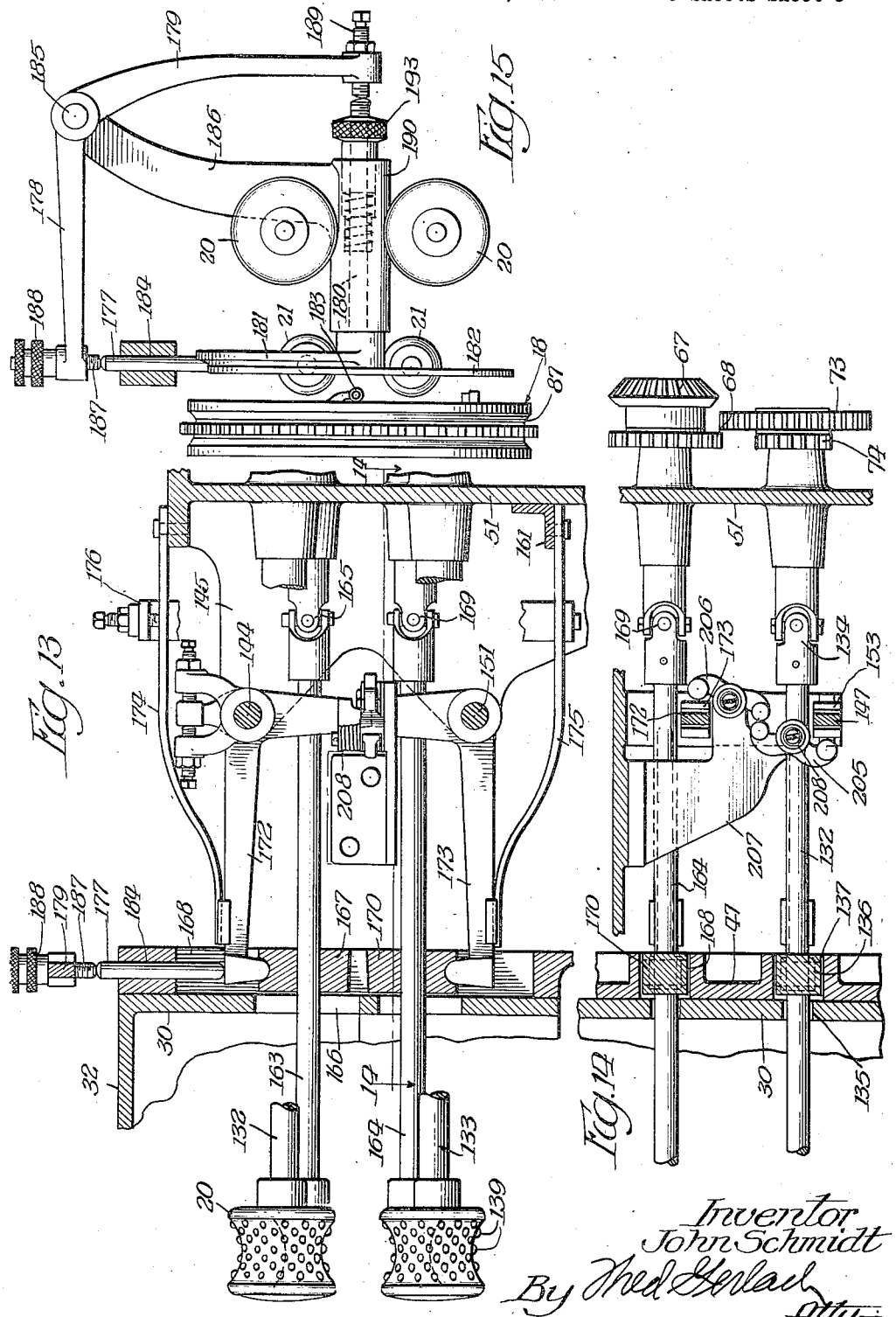

Patented Sept. 10, 1940

2,214,285

UNITED STATES PATENT OFFICE 2,214,285

GREEN CORN CUTTING APPARATUS

John Schmidt, Philadelphia, Pa.

Application February 11, 1939, Serial No. 255,847

26 Claims. (Cl. 130—9)

The present invention relates generally to apparatus for cutting the kernels from the cobs of green corn in connection with commercial packing or canning. More particularly the invention relates to that type of corn cutting apparatus which by way of adjustment is capable of several different types of cutting such, for example, as cream style cutting, half kernel cutting, and whole kernel cutting, and as the main or essential parts thereof comprises (1) an elongated housing which is supported in an elevated position by way of a frame or like supporting medium and embodies a corn inlet at the front end thereof, discharge means at its bottom for the cut kernels, and an outlet for the cobs at the rear end thereof; (2) an endless horizontally extending chain type conveyor which has a trough associated with its upper reach and operates when driven to feed the ears to be cut one at a time and in longitudinal alignment through the inlet end into the housing; (3) a rotary cutting head which is disposed in the front portion of the housing in alignment with the inlet and embodies an annular series of substantially radially movable knives for cutting the kernels from the ears; (4) a rotary scraping head which is mounted in the housing behind the cutting head and embodies an annular series of substantially radially movable scrapers for scraping the cobs after cutting of the kernels by the cutting head; (5) three pairs of opposed feed rolls which serve when the apparatus is in operation to feed the ears successively through the cutting head, the scraping head, and the outlet and are positioned or disposed in the housing in the following manner: one pair in front of the cutting head and between such head and the front end of the housing, the second pair between the cutting head and the scraping head, and the third pair behind the scraping head and between such head and the rear end of the housing; and (6) power driven gearing for conjointly driving the endless conveyor, the cutting and scraping heads and the feed rolls.

One object of the invention is to provide a corn cutting apparatus of this type which is an improvement upon, and is more efficient in operation than, previously designed cutting apparatus of the same general character, including that which is disclosed in and forms the subject of United States Letters Patent No. 2,034,993 granted to me March 24, 1936.

Another principal and important object of the invention is to provide a corn cutting apparatus of the aforementioned type in which initial opening of the knives of the rotary cutting head, that is outward radial movement of such knives in connection with feed of an ear of corn thereto, is controlled by the pair of feed rolls between the cutting head and the front end of the housing as distinguished from stationary gauges or gauges which rotate with the cutting head, and such rolls as the result of the design of the knives have and require no sharp pointed spurs for holding the ears against rotation with the result that none of the kernels of the ears is mutilated prior to cutting of the kernels by the knives and wastage is thus completely eliminated.

Another object of the invention is to provide a green corn cutting apparatus of the last mentioned character which includes novel and simple means for adjusting or varying the depth of cut of the knives of the rotary cutting head while the apparatus is in operation.

Another object of the invention is to provide a cutting apparatus of the type and character under consideration in which the knives of the rotary cutting head are so weighted and designed that upon movement together of the feed rolls and discharge of an ear of corn from the cutting head, centrifugal force operates to move them inwards and hence springs and like mechanical balancing or closing devices which are likely to stick or become inoperative in the presence of the various starches or juices which result from cutting of the kernels are eliminated and the rotary cutting head as a whole remains in a sanitary condition and requires little if any cleaning.

Another object of the invention is to provide a green corn cutting apparatus of the aforementioned type in which the rotary cutting head with its series of substantially radially movable knives for cutting the kernels from the ears immediately upon entry of the ears into the housing embodies around the knives a saucer shaped ring type wall, the outer margin of which is substantially quadrantally curved with the result that the cut kernels striking thereagainst are materially retarded as far as their speed of outward travel is concerned and hence they pass through the discharge means at the bottom of the housing at such reduced speed that there is no likelihood of bleeding or mashing taking place.

Another object of the invention is to provide a cutting apparatus of the type and character hereinbefore set forth in which the knife controlling feed rolls in front of the rotary cutting head are of extremely small diameter as compared to the feed rolls between the two heads and the feed rolls between the scraping head and the rear end of the housing, and have associated with them a pair of opposed large diameter feed rolls which are located in front of the corn inlet at the front of the housing and operate during use or operation of the apparatus to pick up the ears successively from the discharge end of the endless horizontally extending chain type conveyor and feed them directly into engagement with the small diameter feed rolls in front of the cutting head.

Still another object of the invention is to provide a green corn cutting apparatus of the last mentioned character in which the small diameter rolls for controlling the knives and feeding the ears through the rotary cutting head are disposed immediately in front of the knives and the large diameter feed rolls in front of the small diameter rolls are movable to and from one another in connection with feed of different sized ears and have associated therewith means whereby in response to opening thereof as a result of an ear of corn passing between them the small diameter feed rolls in front of the knives of the cutting head are caused automatically to open or move apart into an ear receiving or accommodating position.

A further object of the invention is to provide a green corn cutting apparatus of the type under consideration in which the cutting and scraping heads are rotatably mounted within the housing by way of sheave-like rollers and the housing is of two-piece design and includes an upper section which carries certain of the rollers and is hinged at one side so that it together with the rollers which are carried thereby may be swung upwardly and outwardly into an open position wherein the heads are accessible for inspection or removal purposes.

A still further object of the invention is to provide a green corn cutting apparatus which is generally of new and improved construction and in which durability and compactness of design are combined with adjustability of the various parts.

Other objects of the invention and the various advantages and characteristics of the present green corn cutting apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 4 is an enlarged vertical transverse section taken on the line 4—4 of Figure 1 and showing in detail the two-piece design of the housing and also the sheave-like rollers for supporting rotatably the knife equipped cutting head and the gearing for driving such head;

Figure 5 is a vertical longitudinal section taken on the line 5—5 of Figure 1 and showing the arrangement and relative position of the feed rolls for successively feeding the ears from the horizontally extending chain type conveyor through the cutting head, the scraping head, and the outlet at the rear end of the housing;

Figure 6 is a vertical longitudinal section taken on the line 6—6 of Figure 1 and illustrating in detail the arrangement of the gears for driving the rotary cutting and scraping heads;

Figure 7 is a vertical longitudinal section taken on the line 7—7 of Figure 1, and disclosing the arrangement and design of the gearing for conjointly driving the endless conveyor and the feed rolls;

Figure 8 is an enlarged horizontal section taken on the line 8—8 of Figure 2 and exhibiting in detail the construction, design and arrangement of certain parts of the means whereby the knives of the rotary cutting head are initially opened in response to opening of the small diameter feed rolls in front of the cutting head;

Figure 9 is an enlarged vertical transverse section taken on the line 9—9 of Figure 1 and showing the design and arrangement of other parts of the means whereby the knives of the cutting head are caused to open in response to opening of the small diameter feed rolls in front of the cutting head;

Figure 10 is a front view of the rotary cutting head;

Figure 11 is a rear view of the cutting head illustrating in detail the arrangement, design and construction of the substantially radially movable knives;

Figure 12 is a detail section taken on the line 12—12 of Figure 11 and illustrating the design and arrangement of one of the bell cranks of the means or mechanism for controlling opening of the cutting head knives;

Figure 13 is a fragmentary vertical transverse section illustrating the manner of mounting, driving and controlling the small diameter feed rolls in front of the rotary cutting head;

Figure 1:
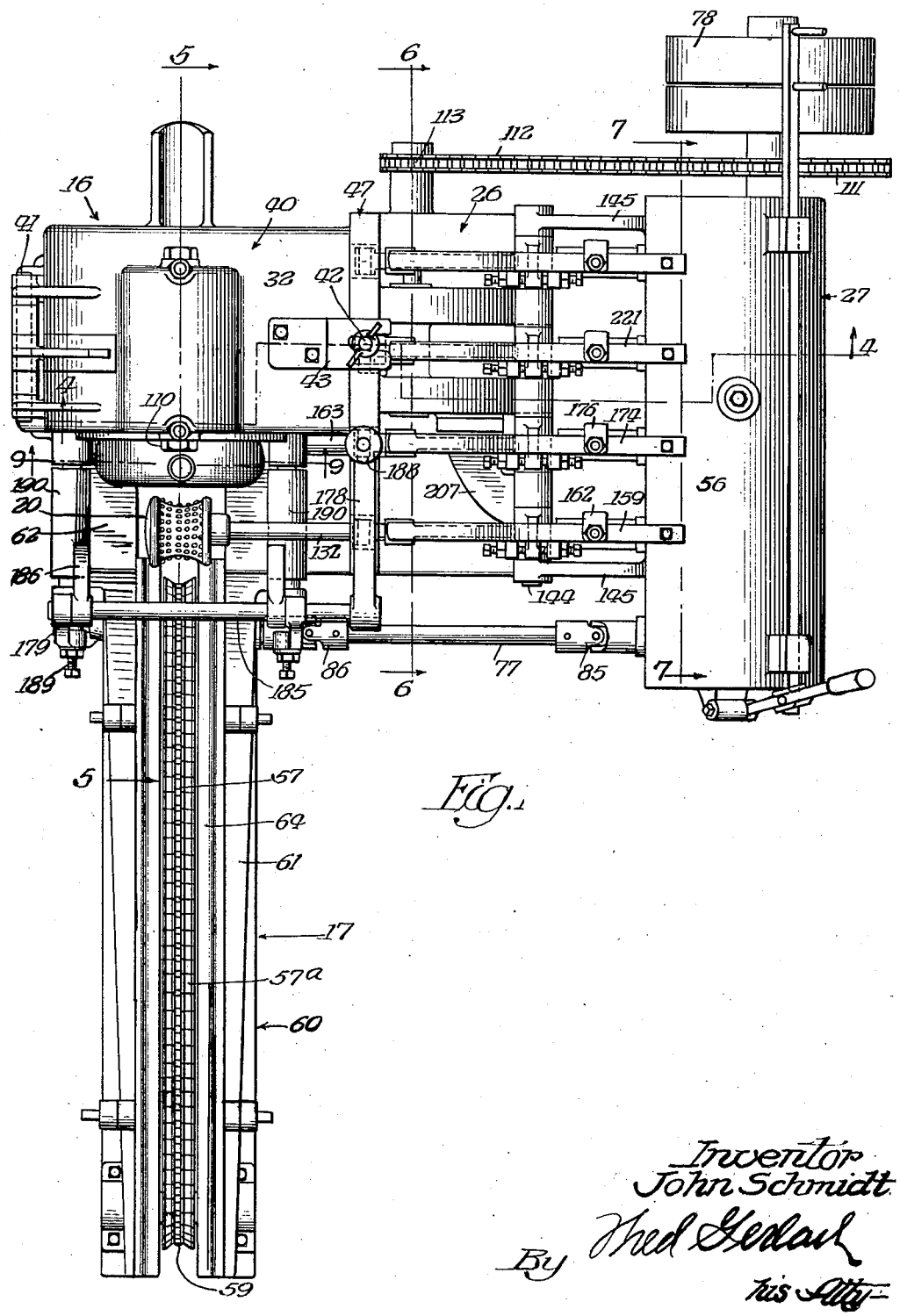
Figure 1 is a plan view of a cutting apparatus embodying the invention.

Figure 14 is a fragmentary horizontal section taken on the line 14—14 of Figure 13 and exhibiting in detail the design and arrangement of the means whereby the small diameter feed rolls are caused automatically to open for ear receiving purposes in connection with opening of the large diameter feed rolls between the discharge end of the endless conveyor and the front end of the housing; and Figure 15 is a fragmentary side elevation of the knife opening means.

The apparatus which is shown in the drawings constitutes the preferred embodiment of the invention. It is adapted to cut the kernels from the cobs of green corn in connection with packing or canning on a commercial scale and is so designed that by way of adjustment it is capable of cream style cutting, half kernel cutting, or whole kernel cutting. As its main parts the apparatus comprises an elongated housing 16, an endless conveyor 17 for feeding the ears to be cut into the housing; a rotary cutting head 18 for cutting the kernels from the ears; a rotary scraping head 19 for scraping the cobs after cutting of the kernels by the cutting head; a pair of feed rolls 20 for feeding the ears of corn to be cut from the conveyor 17 into the housing; a pair of feed rolls 21 for feeding the ears from the rolls 20 to and through the cutting head 18; a pair of feed rolls 22 for feeding the cut ears from the cutting head to and through the scraping head 19; a pair of feed rolls 23 for discharging the cobs from the housing after they have been subjected to the action of the scraping head; and gearing 24 for conjointly driving the endless conveyor, the cutting heads, and the feed rolls.

The housing 16 is disposed in a horizontal position at one side of a leg equipped frame 25, and has associated with it a pair of elongated horizontally extending casings 26 and 27. It is positioned adjacent to, and in parallel relation with, the casing 26 and comprises a front end wall 28, a rear end wall 29, an inner side wall 30, an outer side wall 31, a top wall 32 and a bottom wall 33. The front end wall 28 embodies in the upper portion thereof a circular inlet 34 for the corn to be cut and the rear end wall 29 embodies in its upper portion and in axial alignment with the inlet 34 a circular outlet 35 for the cobs. The bottom wall 33 defines with the front and rear end walls 28 and 29, the two side walls 30 and 31, and the top wall 32, a compartment or chamber for the rotary cutting head 18 and the rotary scraping head 19 and embodies three downwardly extending discharge passages 36, 37 and 38. The passage 36 is positioned adjacent to the front end wall 28 and serves to guide or discharge downwardly the kernels or kernel parts that are cut by the cutting head 18. The discharge passage 37 is positioned behind the passage 36. It is disposed between the two cutting heads, as shown in Figure 5, and serves to guide or discharge downwardly the portions of the kernels which are scraped from the cobs by the scraping head 19. The passage 38 is positioned adjacent to the rear end wall 29 and serves to discharge downwardly any of the scrapings which are not discharged from the housing 16 via the discharge passage 37. The housing 16 is preferably in the form of a composite casting and is so formed or designed that it includes a fixed or stationary lower section 39, and a removable upper section 40. The upper section, as shown in Figure 4, is connected at the outer side portion thereof to the lower section by a hinge 41 so that it may be swung upwardly and outwardly away from the lower section into a so-called open position wherein it exposes the cutting and scraping heads for inspection or removal purposes. A nut equipped eye-bolt 42, and a bifurcated lug 43 serve releasably to lock or hold the upper section 40 of the housing 16 in its closed or operative position. The eye of the eye-bolt 42 (see Figure 4) is pivotally connected by way of a pin 44 to a lug 45 on the top of the casing 26 so that it may be swung upwardly into, and downwardly from, a vertical position. The bifurcated lug 43 is bolted to the top wall 32 of the housing 16 and is arranged so as to receive the shank of the bolt 42 when the latter is swung upwardly. The nut on the bolt is adapted when the bolt is in its vertical position and in seated relation with the lug 43 to bear against the lug and thus lock the upper section 40 of the housing in its operative position. When it is desired to release the upper section of the housing so that it may be swung upwardly and outwardly in order to provide access to the working parts within the housing, it is only necessary to loosen the nut on the eye-bolt and then swing the eye-bolt downwardly away from the lug 43.

The casing 26 embodies a base 46 at the bottom thereof and a flat side wall 47 and is shaped to form a pair of gear compartments 48 and 49. The latter are positioned transversely of the housing 16 and communicate with the compartment within the latter by way of aligned openings or slots in the side wall 47 of the casing 26 and the side wall 30 of the housing 16. The base 46 of the casing 26 is bolted or otherwise fixedly secured to the top of the frame 25. The side wall 47 abuts against the outer face of the inner side wall 30 of the housing 16 and carries bolts or other attaching devices for holding the lower section 39 of the housing 16 in fixed relation with the frame 25.

The casing 27 defines a compartment for parts of the gearing 24 and comprises a base 50, an inner side wall 51, an outer side wall 52, a front end wall 53, a rear end wall 54, a bottom wall 55, and a removable top wall 56. The base 50 is fixedly secured to the top of the frame 25 and serves to hold the casing 27 in connected relation with the frame. The inner side wall 51 of the casing 27 is flat, as shown in Figure 4, and is arranged in laterally spaced parallel relation with the side wall 47 of the casing 26.

Figure 2:
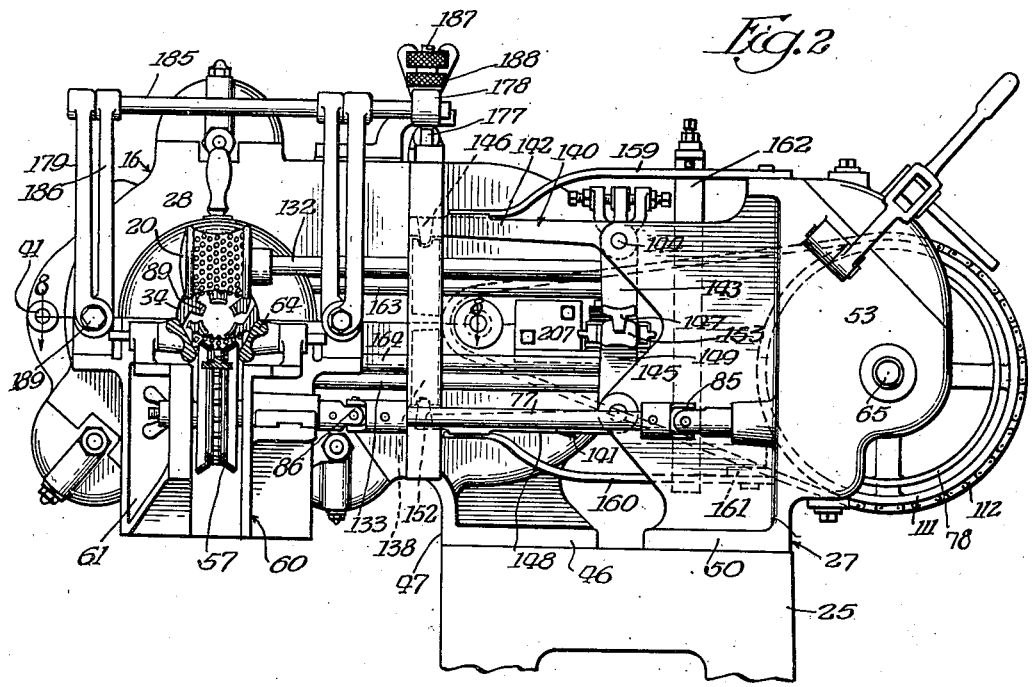
Figure 2 is a view of the front end of the apparatus.
Figure 3:
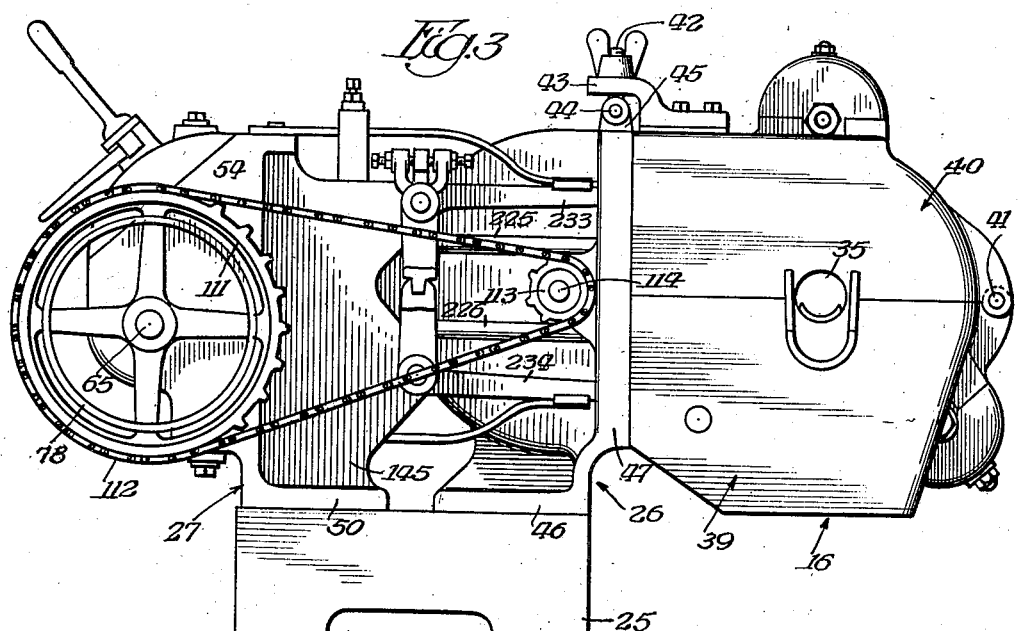
Figure 3 is a view of the rear end of the apparatus.

The endless conveyor 17 for feeding the ears of corn to be cut into the housing for corn cutting and scraping purposes extends horizontally and comprises a chain 57, and a pair of sprocket wheels 58 and 59. It is positioned directly in front of the front end wall 28 of the housing 16 and is carried by an elongated horizontally extending frame 60. The latter consists of a pair of frame members 61 which are positioned in laterally spaced and parallel relation and have the rear ends thereof bolted to a bracket 62 at the front end of the housing 16. The sprocket wheels 58 and 59 are rotatably mounted and carry the chain 57 in such manner that the upper reach thereof is positioned above the top portions of the frame members 61 and in alignment with the inlet 34 in the upper portion of the front end wall 28 of the housing 16. Said upper reach of the chain of the endless conveyor is supported by an elongated strip 63 and has a pair of elongated laterally spaced trough forming members 64 at its sides. As shown in Figures 1 and 2, the members 64 are positioned over and are connected by brackets to the top portions of the members 61 of the frame 60. The links of the chain 57 have upwardly extending side lugs 57$^a$ which, as shown in Figure 2, coact with the trough forming members 64 to bring the ears of corn in centered relation with the inlet 34 in the front wall of the housing 16. The sprocket wheel 58 is adapted to be driven so that the husked ears of corn on the upper reach of the chain of the conveyor are caused to be fed one at a time and in longitudinal alignment to and between the feed rolls 20. The means for driving the sprocket wheel 58 comprises a shaft 65, a bevel gear 66, a bevel gear 67, a gear 68, a gear 69, a pinion 70, a gear 71, a gear wheel 72, a gear wheel 73, a pinion 74, a gear wheel 75, a gear 76, and a shaft 77. Such parts form or constitute a part of the gearing 24 and are for the most part disposed within the casing 27. The shaft 65 extends longitudinally through the casing 27, as shown in Figure 7, and is journaled at the ends thereof in coaxially aligned bearings in the front and end walls 53 and 54 of said casing. The rear end of the shaft 55 projects rearwardly beyond the rear end 54 of the casing 27 and carries a pulley 78. The latter is fixedly connected to said rear end of the shaft 65 and is adapted to be driven by a belt (not shown) and effect drive of the shaft 65. The bevel gear 66 is fixedly secured to the central portion of the shaft 65 and meshes with, and serves to drive, the bevel gear 67. The latter is mounted on the inner end of a stub shaft 79 which projects through and is mounted in a bearing in the inner side wall 51 of the casing 27. The gear 68 is fixedly secured to the inner end of the stub shaft 79 and meshes with, and serves to drive, the gear 69. The latter is mounted on the inner end of a stub shaft 80 which projects through and is journaled in a bearing in the inner side wall 51 of the casing 27 and is positioned above and in parallel relation with the stub shaft 79. The pinion 70 is fixedly secured to the inner end of the stub shaft 80 and meshes with, and serves to drive, the gear 71. The latter is mounted on a stub shaft 81 in the upper portion of the casing 27 and meshes with, and serves to drive, the gear 75 wheel 72. Such gear wheel is mounted on a stub shaft 82 and meshes with, and in turn serves to drive, the gear wheel 73. The stub shaft 82 extends through and is journaled in a bearing in the inner side wall 51 of the casing 27 and overlies, and is vertically aligned with, a stub shaft 83. The latter stub shaft projects through and is journaled in a bearing in the inner side wall 51 and carries and is driven by the gear wheel 73. The pinion 74 is fixed to the inner end of the stub shaft 83 and meshes with, and serves to drive, the gear wheel 75. The latter is in the nature of an idler, and meshes with, and in turn serves to drive, the gear 76. The latter is disposed beneath the shaft 65 and is fixed to the inner end of a stub shaft 84, which extends through, and is journaled in a bearing in, the inner side wall 51 of the casing 27. The shaft 77 extends transversely of the housing 16 and the casings 26 and 27, and is connected at one end thereof to the outer end of the stub shaft 84 by a universal joint 85. The other end of the shaft 77 is connected by a universal joint 86 to one end of the supporting shaft for the sprocket wheel 58. When the shaft 65 is driven by drive or rotation of the pulley 78, the endless conveyor 17 is in turn driven through the medium of the aforementioned parts of the gearing 24 and operates, as hereinbefore pointed out, to deliver or feed husked ears of corn, one at a time, and in longitudinal alignment to and between the feed rolls 20. It is contemplated that the ears be placed on the conveyor with the small ends first and the butt ends last.

The cutting head 18 is positioned or disposed in the front portion of the housing 16 and is adapted by change or adjustment to cut either the tips or outer ends of the kernels of corn in connection with cream style cutting or to cut the whole kernels from the cobs in connection with whole kernel cutting. It is further adapted by change or adjustment to cut the outer half portions of the kernels in connection with half kernel cutting and comprises a ring gear 87, a ring 88, a set of knives 89, and a ring-shaped cap 90. The ring gear 87 consists of an annular series of teeth 91, a web 92, and an inner hub-like part 93. The teeth 91 of the ring gear are formed integrally with the outer margin of the web 92 and are bounded at the sides thereof by a pair of outwardly flared ring-shaped flanges 94. The web 92 is flat and embodies in the rear face thereof an annular groove 95 for the ring 88. The hub-like part 93 is formed integrally with the web and has a flat rear face which is coplanar with the rear face of said web. The front portion of the part 93 projects in the direction of the front end wall 28 of the housing 16 and is shaped to form a saucer shaped ring type wall 96. This wall surrounds the cutting parts of the knives 89 and is adapted to receive the cut kernels and direct them into the discharge passage 36 in the bottom wall 33 of the housing 16. The inner face of the wall 96 is quadrantally curved, as shown in Figure 8, and as a result the kernels striking thereagainst are materially retarded as far as their speed is concerned, and hence pass into the discharge passage 36 at a reduced speed. By retarding the speed of the cut kernels no bleeding or mashing of the kernels takes place while the cut kernels are in the housing 16 or passing downwardly through the discharge passage 36. The ring 88 is rotatably mounted in the groove 95 and is of such thickness that the rear face thereof is substantially flush with the rear face of the web 92 of the ring gear 87. The knives 89 are arranged in an annular series and comprises inner cutting parts 97 and outer attaching parts 98. The cutting parts 97 of the knives 89 are disposed in the center of the ring gear and project in the direction of the feed rolls 21. They are adapted to have the ears of corn which are fed toward them by the rolls 20 pass through the space between them and have cutting edges for cutting the kernels of corn. The inner faces of the cutting parts 97 are beveled adjacent to the cutting edges so that the knives cut the kernels through the so-called heart line in connection with whole kernel cutting and do not penetrate inwardly of the so-called cob line. The outer attaching parts 98 of the knives 89 extend at right angles to, and outwardly from the rear ends of, the inner cutting parts 97 and fit against the rear faces of the inner hub-like part 93 and the web 92 of the ring gear. They are pivotally connected to the web by way of pins 99 and have at the outer ends thereof integral arms 100. The pins 99 have heads 101 at the outer ends thereof and so support the knives that they are movable inwardly and outwardly in connection with the cutting of ears of different diameter. The arms 100 extend circumferentially and have weights 102 at the outer or free ends thereof. These weights are so positioned with respect to the pins 99 that during drive of the cutting head 18 they operate through the medium of centrifugal force to urge or swing inwards the knives 89. In addition to the weights 102 the arms 100 of the outer attaching parts 98 of the knives 89 have notches 103. Lugs 104 on the ring fit within the notches 103 and form with such notches, lug and notch connections whereby the knives are connected together for conjoint inward and outward movement. When the ring is rotated in one direction with respect to the ring gear 87 the knives are caused to move outwards and when the knives move inwards in response to the action of the weights 102 the ring is caused to move in the opposite direction relatively to the gear wheel 87. Preliminary or initial opening or outward swinging of the knives by rotation of the ring 88 in said one direction is controlled or effected by opening of the feed rolls 21, as hereinafter described. The ring shaped cap 90 of the cutting head 18 fits against the rear faces of the outer connecting parts 98 of the knives and is held in place by means of the heads 101 of the pins 99. The head 18 is rotatably mounted or supported within the housing 16 by means of sheave-like rollers 105, 106 and 107. The latter are arranged in triangular relation and have grooved peripheries which straddle the teeth 91 of the ring gear 87 and bear against the outer faces of the flanges 94, as shown in Figure 5. The rollers 105 and 106 are rotatably mounted in pockets at the sides of the bottom wall 33 of the housing 16 (see Figure 4) and are arranged beneath and so as to support the head 18. The roller 107 is disposed in a pocket in the top wall 32 of the housing 16 and is carried by a shaft 108. It bears against the upper portion of the flange 94 and is disposed midway between the rolls 105 and 106. The shaft 108 extends lengthwise of the housing 16 and is provided at the front end thereof with an eccentrically disposed reduced stem 109. The latter extends through a hole in the front end wall 28 of the housing 16 and is provided with a nut 110 for securing in place the roller supporting stub shaft 108. By having the stem 109 eccentrically disposed with respect to the shaft proper, the shaft together with the roller 107 may be adjusted by rotation thereof, towards the top portion of the gear wheel in order to take up any wear as far as the flanges 94 are concerned. When the nut 110 is tightened, the stud shaft is clamped against rotation and holds the roller 107 for rotation above a fixed axis. When the upper section 40 of the housing 16 is released and then swung upwardly and outwardly into its open position the roller 107 moves with it and thus releases the cutting head 18 so that it may be removed bodily from the compartment in the housing. During operation of the apparatus, the cutting head 18 is driven from the shaft 65 by way of a sprocket wheel 111, an endless chain 112, a sprocket wheel 113, a shaft 114, and a gear wheel 115. These parts form or constitute a part of the gearing 24 and effect a continuous and comparatively high speed drive of the head. The sprocket wheel 111 is fixed to the rear projecting end of the shaft 65 and is disposed between the rear end wall 54 of the casing 27 and the pulley 78. The sprocket wheel 113 is fixed to one end of the shaft 114 and is connected for drive by the sprocket wheel 111 by the endless chain 112. The shaft 114 extends lengthwise of the apparatus and projects through and is journaled in bearings in the casing 26. The gear wheel 115 is disposed in the gear compartment 48 in said casing and is fixed to one end of the shaft 114, as shown in Figure 6. It meshes with the teeth of the ring gear 87, as shown in Figure 4, and operates in response to drive of the shaft 65 to drive the head 18 for corn cutting purposes.

The rotary scraping head 19 is disposed in the housing 16 between the feed rollers 22 and 23. It serves to scrape the ears after cutting of the kernels by the knives of the rotary cutting head 18 and comprises a ring gear 116, a ring 117, a set of scrapers 118, and a ring shaped cap 119. The gear 116 has the same external diameter as the ring gear 87 of the cutting head 18 and embodies an annular series of teeth 120 and a web 121. The teeth 120 are bounded at the sides thereof by a pair of ring-shaped or annular flanges 122 which are outwardly flared and are formed integrally with the outer marginal portion of the web 121. The ring 117 is rotatably mounted in an annular groove 123 in the rear face of the web 121 of the ring gear. The scrapers 118 are arranged in an annular series and comprise inner inwardly extending scraping parts 124 and outwardly extending attaching parts 125. The scraping parts 124 of the scrapers are disposed in the central portion of the ring gear and are bent or shaped so that they extend forwardly and outwardly. They are adapted to receive the ears from the feed rolls 22 and operate during drive of the head 19 to scrape from the cobs that portion which remains in the hulls or kernels after the ears have been subjected to the action of the cutting head 18. The attaching parts 125 extend substantially radially from the scraping parts 124 and fit against the rear face of the web 121 of the ring gear 116. Headed pins 126 extend through the ring-shaped cap 119 and the attaching parts 125 and serve to hold the cap 119 in place and also pivotally to support the scrapers so that they are free to move to and from one another in connection with the scraping of different sized ears. Arms 127 like the arms 100 of the outer attaching parts 98 of the knives 89 of the cutting head are formed on the outer ends or extremities of the parts 125 of the scrapers of the scraping head and these arms 127 have weights 128 at their outer or distal ends. Such weights are so arranged with respect to the pins 126 that they serve during drive of the scraping head 19 and in response to the action of centrifugal force to urge the scrapers inwardly. Lug and slot connections (not shown) are formed between the attaching parts 125 and the ring 117 and serve so to connect the ring to the scrapers that the scrapers move inwardly and outwardly in unison. When a large ear of corn is encountered by the inner scraping parts 124 the scrapers are caused to move outwards to the proper extent for effective scraping of the ear. This is attributable to the specific shape of the parts 124. As soon as an ear leaves the scrapers the latter move inwards into their normal ear receiving position, as the result of the action of the weights 128 at the outer extremities or ends of the arms 127. The front face of the web 121 of the ring gear 116 is dished, as shown in Figure 8, and serves to deflect the scrapings into the discharge passage 37 in the bottom wall 33 of the housing 16. The scraping head 19 is rotatably supported by way of a set of sheave-like rollers like the set of rollers 105, 106 and 107 for the rotary cutting head 118. The set of rollers for the scraping head 119 includes an upper roller 129 which, as shown in Figure 6, is mounted on a stub shaft 130 in alignment with the shaft 109 for the roller 107. The stub shaft 130 is connected to the rear end wall of the housing 16 by a reduced eccentric stem and so connects the roller 129 to the upper section 40 of the housing 16 that upon opening of the upper section such roller is caused to swing out of its operative position and thus frees the scraping head 19 so that it may be removed if desired. During operation of the apparatus, the head 19 is driven by way of a gear wheel 131 which is disposed in the gear compartment 49 in the casing 26, meshes with the teeth 120 of the ring gear 116 and is fixed to the shaft 114. When the last mentioned shaft is driven from the shaft 65 during operation of the machine, the gear wheels 115 and 131 are caused to rotate and effect high speed drive of the cutting and scraping heads respectively.

The feed rollers 20 are positioned between the discharge end of the endless conveyor 17 and the front end 28 of the housing 16 and serve to feed the ears of corn to be cut from the conveyor into the front end of the housing through the inlet 34. They are positioned one above the other, as shown in Figure 5, and are fixed to, and mounted respectively on, a pair of transversely extending shafts 132 and 133. The shaft 132 overlies the shaft 133, as shown in Figure 13, and is drivably connected to the outer projecting end of the stub shaft 82 by a universal joint 134. It extends through a slot 135 in the inner side wall 30 of the housing 16 and is confined to vertical swinging movement by way of a shoe 136. The latter, as shown in Figure 14, is mounted on the central portion of the shaft 132 and is slidably mounted in a vertical slideway 137 in the side wall 47 of the casing 26. The shaft 133 for the lower feed roll 20 is drivably connected to the outer projecting end of the stub shaft 83 by way of a universal joint (not shown) and is confined to vertical swinging movement by way of a shoe 138 (see Figure 2). This last mentioned shoe is mounted on the central portion of the shaft 133 and is slidably mounted in the slideway 137 beneath the shoe 136. The two feed rolls 20 have concave peripheries with short hemispherical driving knobs 139 thereon and are driven in opposite directions as a result of the fact that the gear wheels 72 and 73 are in mesh with one another. During operation of the apparatus the rolls 20 are driven, as shown by arrows in Figure 5, and operate as hereinbefore pointed out to feed the ears of corn from the discharge end of the endless conveyor through the inlet 34 to the feed rolls 21. The rolls 20 are of comparatively large diameter and do not have or require any sharp pointed driving spurs. As a result of the latter they do not mutilate or mash any of the kernels of the corn and in addition they automatically bring the successive ears of corn into proper or true alignment with the feed rolls 21. When a thick ear is encountered, the rolls 20 move or swing apart, such motion being permitted by the universal joints between the shafts 132 and 133 and the stub shafts 82 and 83. The feed rolls 20 are connected for simultaneous and equidistant outward and inward movement by way of a pair of bell cranks 140 and 141. These cranks are associated with the shafts 132 and 133 respectively and are positioned adjacent to the casing 26. The bell crank 140 is directly above the bell crank 141, as shown in Figure 6. It comprises a horizontally extending arm 142, and a depending vertically extending arm 143, and is mounted for vertical pivotal movement on a horizontally extending shaft 144. The latter, as shown in Figure 1, is disposed between the casings 26 and 27, and is supported at the ends thereof by way of a pair of brackets 145. Such brackets are formed integrally with, and project outwardly from, the inner side wall 51 of the casing 27. The arms 142 and 143 of the bell crank 140 radiate from the shaft 144 and are adapted to move conjointly. The distal end of the arm 142 embodies a depending finger 146 which fits within a recess in the upper end of the shoe 136. The lower or distal end of the arm 143 of the bell crank 140 embodies a single depending tooth 147 (see Figure 2). The bell crank 141 is in the form of a one piece casting and comprises a horizontally extending arm 148, an upstanding vertically extending arm 149, and a hub 150. The hub is located at the juncture of the two arms 148 and 149 and is rotatably mounted on a shaft 151 which is disposed beneath and in parallel relation with the shaft 144 and is supported at the ends thereof by the brackets 145. The distal end of the arm 148 embodies an upstanding finger 152 which fits within a recess in the lower end of the shoe 138. The upper or distal end of the arm 149 embodies a pair of teeth 153 and these teeth, as shown in Figure 2, straddle the tooth 147 at the lower end of the arm 143 and so connect the two crank arms that they move in unison or in geared relation and thus cause the feed rolls 20 to move to and from one another simultaneously and equidistantly. The arm 143 is connected for conjoint swinging movement with the arm 142 of the bell crank 140 by way of a yoke 154, and an abutment arm 155. The yoke 154 extends upwardly from the upper end of the arm 143 and is joined to such end by way of a hub 156 which is journaled on the shaft 144. The abutment arm 155 is joined to the inner or proximal end of the arm 142 by a hub 157 which is journaled on said shaft 144 and fits against the hub 156.

As shown in Figure 2, the arm 155 extends laterally into the yoke 154 and the latter supports at the ends thereof a pair of adjusting screws 158. These screws abut against the abutment arm 155 and connect the yoke and arm 143 for conjoint swinging movement with the arm 155 and the arm 142 of the bell crank 140. By adjusting the screws 158 the arms 142 and 143 of the bell crank 140 may be angularly adjusted for feed roll spacing purposes. The rolls 20 are urged together into a closed position (see Figure 13) by way of a pair of leaf springs 159 and 160. These springs are positioned one over the other, as shown in Figure 2, and project from the casing 27 in the direction of the housing 16. The spring 159 is anchored to a lug or flange on the upper margin in the inner side wall 51 of the casing 27 and has at its outer end a pad which bears against the central portion of the arm 142 of the bell crank 140. The leaf spring 160 is anchored to an angle bracket 161 on the inner side wall 51 of the casing 27 and has at its free end a pad which straddles and abuts against the central portion of the arm 148 of the bell crank 141. A C-clamp 162 is applied to the inner or anchored ends of the two leaf springs and constitutes means for varying the force of the springs.

The feed rolls 21 are of much smaller diameter than the feed rolls 20 and serve not only to feed the ears of corn from the rolls 20 through the rotary cutting head 18 but also to control inward and outward movement of the knives of the head in connection with ears of different diameter. They are positioned immediately in front of the knives 89 of the cutting head 18, as shown in Figure 8, and are mounted one above the other on a pair of transversely extending shafts 163 and 164. The shaft 163 overlies the shaft 164 and is drivably connected to the outer projecting end of the stub shaft 80 by a universal joint 165. It extends through a slot 166 in the inner side wall 30 of the housing 16 and is confined to vertical swinging movement by way of a shoe 167 which, as shown in Figures 13 and 14, is slidably mounted in a vertical slideway 168 in the side wall 47 of the casing 26. The shaft 164 for the lower feed roll 21 is drivably connected to the outer projecting end of the stub shaft 71 by way of a universal joint 169 and is confined to vertical swinging movement by way of a shoe 170. The latter is mounted on the central portion of the shaft 164 and is slidably mounted in the slideway 168 beneath the shoe 167. The two feed rolls 21 have concave peripheries with short hemispherical driving knobs 171 and are driven in opposite directions as the result of the fact that the gears 68 and 69 are in mesh with one another. During operation of the apparatus, the rolls 21 are driven, as shown by arrows in Figure 5, and operate to feed the ears of corn past the knives of the rotary cutting head 18 for kernel cutting purposes. The rolls 21 do not have or require any sharp pointed kernel mutilating spurs and their closeness to the knives is attributable to their small diameter. When a thick ear is encountered the rolls 21 move or swing apart and such action or motion is permitted by the universal joints 165 and 169. The feed rolls 21 are connected together in synchronous outward and inward movement by way of a pair of bell cranks 172 and 173. These bell cranks are associated with the shafts 163 and 164 respectively, and are the same in design and construction as the bell cranks 140 and 141. The bell crank 172 is mounted for vertical swinging movement on the shaft 144 and has at the distal end of its horizontal arm a depending finger which fits within a recess in the upper end of the shoe 167. The bell crank 173 is mounted for vertical pivotal movement on the shaft 151 and embodies at the outer or distal end of its horizontal arm an upstanding finger which fits within the recess in the lower end of the shoe 170. A pair of leaf springs 174 and 175, like the leaf springs 159 and 160 are applied to the horizontal arms of the bell cranks 172 and 173 and serve to urge the feed rolls 21 toward one another. A C-clamp 176, like the C-clamp 162, is applied to the outer ends of the leaf springs 174 and 175 and constitutes means for adjusting the tension or pressure of such springs.

In addition to the housing 16, the conveyor 17, and the other parts hereinbefore described, the apparatus comprises mechanism for automatically moving outward the knives of the cutting head in response to opening of the feed rolls 21 so that the knives are properly positioned to receive an ear of corn for cutting purposes regardless of the diameter or thickness of the ear. This mechanism comprises a vertically extending pin 177, a horizontally extending arm 178, a pair of vertically extending arms 179, a pair of horizontally extending plungers 180, a semicircular bracket 181, a ring shaped track 182, and a set of three bell-cranks 183. The pin 177 is mounted for longitudinal or axial sliding movement in a bore 184 in the upper portion of the side wall 47 of the casing 26 and rests on the depending finger at the outer or distal end of the horizontally extending arm of the bell-crank 172, as shown in Figures 9 and 13. When the upper feed roll 21 moves vertically in response to successive feed of the ears to the cutting head 18 the pin 177 moves up and down in harmony therewith. The horizontally extending arm 178 extends lengthwise of the apparatus and is fixed to and radiates upon a horizontally extending shaft 185. The latter extends transversely across and is positioned above the discharge end of the endless conveyor 17 and is journaled at its ends in a pair of vertically extending bearing brackets 186. The outer or distal end of the arm 178 is provided with a vertically adjustable abutment screw 187, which as shown in Figures 9 and 15 bears against the upper end of the pin 177. When the pin 177 is raised as the result of upward swing of the upper feed roll 21 the arm 178 is raised and causes the shaft 185 to rotate or turn in one direction. When the pin 177 moves downwards as the result of lowering of the upper feed roll 21, the arm 178 swings downwards and effects reverse turning of the shaft 185. The screw 187 is disposed in a vertically extending internally threaded hole in the distal end of the arm 178 and is held in its various adjusted positions by means of a lock nut 188. By adjusting the set screw 187 a change or variation in the depth of cut of the knives of the head may be effected, as hereinafter described. The vertically extending arms 179 are fixed to, and depend from, the shaft 185. They are positioned in straddled relation with the discharge end of the endless conveyor 17 and carry horizontally extending axially adjustable abutment screws 189 at their lower ends. The plungers 180 are mounted for sliding movement lengthwise of the housing 16 in a pair of bearings 190 which are formed integrally with the side portions of the bracket 62 and are disposed in back of the lower ends of the arms 179. The front ends of the plungers 180 are screw threaded and abut against the rear ends of the abutment screws 189. When the arm 178 is raised as the result of upward movement of the shaft for the upper feed roll 21 the plungers 180 are shifted inwards and when the arm 178 swings downwards as the result of closing or lowering of the upper feed roll 21, the plungers are shifted in the reverse or opposite direction by means of a pair of compression springs 191. These springs are disposed in recesses 192 in the bearings 190 and extend around the central portions of the plungers. The front ends of the springs abut against elongated nuts 193 on the front ends of the plungers and the rear ends of the springs abut against annular shoulders 194 at the rear ends of the recesses 192. By adjusting the position of the nuts 193 with respect to the plungers, the plunger retracting strength of the springs may be adjusted or varied. The rear ends of the plungers 180 are fixedly secured to the ends of the semicircular bracket 181 with the result that the bracket moves horizontally to and from the rotary cutting head 18 in response to sliding movement of the plungers 180. The track 182 is positioned directly in front of and in concentric relation with the ring gear 87 of the head 18 and is carried by and fixedly secured to the bracket 181. The bell crank 183 are pivotally supported on a ring shaped bracket 195 on the head 18. The bracket surrounds the inner hub-like part 93 of the ring gear 87 and is secured by bolts 196 so as to rotate with the head 18. The bell cranks 183 are equidistantly spaced and comprise front arms 197 and rear arms 198. The front arms embody at the outer or distal ends thereof fibre or composition pads 199 which bear against and travel around the track 182 during drive or rotation of the head 18 and when an ear of corn is between the rolls 21. The rear arms 197 are joined to the front arms by hub parts 200, and extend rearwardly through slots 201 in the web 92 of the ring gear 87 and into circumferential slots 202 in the ring 88 of the head 18. The hub parts 200 are mounted on studs 203 on the bracket 195 and these studs constitute the means for pivotally supporting the bell cranks 183 for swinging movement to and from the head. When the track 182 is shifted towards the head 18 as the result of upward movement or swing of the upper feed roll 21 the arms 197 of the bell cranks 183 swing toward the ring gear of the head 18 and the rear arms 198 move circumferentially with respect to the ring 88 and cause such ring so to rotate with respect to the ring gear that the knives 89 are moved outwards. The circumferential slots 202 in the ring 88 are elongated, as shown in Figure 12 so that the connections between the rear arms 198 and the ring 88 are of the lost motion variety and the knives are permitted to move outwards in connection with cutting of the ears independently of rearward movement of the track 182. When an ear of corn is fed toward and between the feed rolls 21 by the feed rolls 20 the leading end of the ear forces apart the rolls 21 and this causes opening of the knives 89. The knives, as a result of the lost motion connections between the rear arms 198 and the ring 88, are permitted to float outwards and effect the desired cutting of the kernels from the cob. After the ear passes beyond the feed rolls 21 such rolls move inwards into their normal position as a result of the action of the leaf springs 174 and 175. Upon inward movement of the feed rolls 21 the compression springs 191 in the recesses 192 retract the track 182, the plunger 180, the arms 179, and the arm 178. As soon as the butt end of the ear of corn moves past the knives 89 the latter move inwards as a result of the action of the weights 102. When it is desired to adjust the rotary cutting head 18 for cream style cutting, it is only necessary to adjust downwards the abutment screw 187. When the screw is downwardly adjusted the arm 178 is swung upwards with respect to the upper feed roll 21 and the track 182 is caused to move inwards with the result that the spacing between the knives and the feed rolls is decreased and the knives of the head 18 instead of making a full kernel cut along the cob line cut only the top portions of the kernels. By adjusting the screw 187 the depth of cut of the knives may be varied as desired. The bracket 195 for supporting the bell cranks 183 has arcuate slots 204 (see Figure 10) through which the bolts 196 extend with the result that it may be angularly adjusted with respect to the web of the ring gear 87 of the cutting head 18 in order to take up for any wear of the pads 199.

In order automatically and positively to open the feed rolls 21 to an ear receiving or accommodating position in response to opening of the feed rolls 20 as the result of an ear of corn passing between them, two levers 205 and 206 are provided. The lever 205 is centrally pivoted on a bracket 207 and is positioned adjacent to and extends transversely of the vertically extending arm 149 of the bell crank 141. The bracket 207 is disposed between the feed roll carrying shafts 132 and 133 and is fixedly secured to the casing 26. The lever 206 is centrally pivoted or fulcrumed on the bracket 207 and extends between the lever 205 and the vertically extending arm of the bell crank 172. The lever 205 is arranged so that one end thereof bears against the arm 153 of the bell crank 141. The lever 206, as shown in Figure 14, is arranged or positioned so that one end thereof abuts against the other end of the lever 205 and its other end abuts against the vertically extending arm of the bell crank 172. As a result of the arrangement of the two levers 205 and 206 downward movement of the lower feed roll 20 as a result of the passage of an ear of corn between it and the upper roll 20 and the resultant movement of the vertically extending arm 149 of the bell crank 141 in the direction of the housing 16 cause the lever 205, as viewed in Figure 14, to move clockwise. Such clockwise movement of the lever 205 effects counterclockwise movement of the lever 206 with the result that the bell crank 173 is swung downwards and the feed rolls 21 are thus opened. A coil spring 208 on the pivot pin for the lever 205 serves to rotate said lever 205 in a counterclockwise direction so as to maintain it in its operative position, that is, with its one end in abutment with the vertically extending arm 149 of the bell crank 141. The arrangement of the levers 205 and 206 is such that after initial opening of the feed rolls 21 by opening or separation of the feed rolls 20 are free further to open independently or irrespectively of the feed rolls 20. By employing the levers 205 and 206 which, as hereinbefore pointed out, serve partially or initially to open the feed rolls 21 in response to opening of the feed rolls 20, the ears of corn as they pass in succession toward the cutting head 18 are not subjected to any wedging action as far as the feed rolls 21 are concerned and the latter may be made of small diameter and positioned in extremely close proximity to the cutting edges of the cutting parts 97 of the knives 89.

The feed rolls 22 are positioned between the cutting head 18 and the scraping head 19 and serve, as heretofore pointed out, to feed the cut ears of corn from the cutting head to and through the scraping head. They are positioned one above the other, as shown in Figure 5, and are fixed to and mounted on a pair of transversely extending shafts 209 and 210. The shaft 209 overlies the shaft 210 and is drivably connected to a stub shaft 211 by a universal joint 212. The stub shaft 211 extends through and is journaled in a bearing in the inner side wall 51 of the casing 27 and is driven from the shaft 65 by way of a pair of bevel gears 213 and 214, and a pair of gears 215 and 216. The bevel gear 213 (see Figure 7) is fixed to the shaft 65 and meshes with and serves to drive the bevel gear 214. The latter is mounted on a stub shaft 217 which is disposed beneath and extends parallel to the shaft 211 and extends through and is journaled in a bearing in the inner side wall 51 of the casing 27. The gear 215 is fixedly secured to the stub shaft 217 and meshes with and serves to drive the gear 216 which, as shown in Figure 7, is fixed to the stub shaft 211. The shaft 210 for the lower feed roll 22 is drivably connected to the outer projecting end of the stub shaft 217 by a universal joint 218 and is driven oppositely to the upper feed roll 22. The two shafts 209 and 210 are confined to vertical swinging movement by way of shoes in a vertical slideway in the side wall 47 of the casing 26. A pair of bell cranks 219 and 220 serves to connect the feed rolls together for simultaneous equidistant inward and outward movement. These two cranks are urged inwards by a pair of leaf springs 221 and 222 and are similar in design to the bell cranks 172 and 173. The feed rolls 22 have concave peripheries and each embodies a central knife-like ring-shaped flange 223 and two annular series of spurs 224. The two series of spurs on each feed roll 22 are located at opposite sides of the flange 223 and together with the flange prevent turning of the cobs during scraping of the cobs with the scrapers of the scraping head 19. By employing the flanges 223 in addition to the spurs maximum gripping of the cobs is obtained and there is no likelihood of the cobs being displaced with respect to their line of movement through the apparatus and causing jamming.

The feed rolls 23 are positioned between the scraping head 19 and the back wall 29 of the housing 16 and serve, as hereinbefore set forth, to discharge the cobs from the housing after they have been subjected to the action of the scraping head. They are positioned one above the other, as shown in Figure 6, and are mounted on a pair of shafts 225 and 226. The shaft 225 is drivably connected by a universal joint (not shown) to a stub shaft 227 and the shaft 226 is connected by a universal joint (also not shown) to a stub shaft 228. The two stub shafts extend through and are journaled in bearings in the inner side wall of the casings 27 and are geared together for opposite drive by a pair of gears 229 and 230. The stub shaft 228 is driven from the shaft 65 by way of a pair of bevel gears 231 and 232. A pair of bell cranks 233 and 234 corresponding respectively to the bell cranks 172 and 173 serve to connect the feed rolls 23 together for simultaneous and equidistant outward and inward swinging movement.

When the apparatus is in operation as the result of drive of the shaft 65 and it is desired to cut ears of corn, the operator of the apparatus places the corn one at a time and with the butt ends last on the chain 57 of the endless conveyor 17. After placement upon the conveyor, the corn travels, as hereinbefore pointed out, toward the feed rolls 20. As soon as the small of an ear of corn is fed into engagement with the feed rolls 20, the latter are swung apart and operate as the result of opposite rotation or drive to feed the ear to and between the feed rolls 21. Opening or separation of the feed rolls 20 effects through the medium of the coacting levers 205 and 206 preliminary opening of the feed rolls 21 with the result that such rolls are spaced slightly apart when the ear of corn passes between them. Upon opening or separation of the feed rolls 21 the pin 177, the arm 178, the arms 179, the plungers 180, the track 182, and the bell cranks 183 operate to open the knives 89 of the connecting head 18 so that they are properly positioned to effect cutting of the kernels from the ear. As the ear passes the knives, the kernels are cut from the cob and are flung outwards against the inner saucer-shaped face of the wall 96. This face, as hereinbefore pointed out, operates due to its shape, to retard the cut kernels so that they pass downwardly through the discharge passage 36 at a reduced speed. As soon as the ear leaves the feed rolls 21 the latter, as a result of the action of the leaf springs 174 and 175, move together and the compression springs 191 effect retraction of the track 182. After the ear passes the cutting head the knives 89 move inwards into their closed position as a result of the action of the weights 102. After cutting of the kernels by the head 18 the ear passes through the feed rolls 22 and thence past the scrapers of the scraping head 19 to the feed rolls 23. The scrapers serve to scrape the remaining portions of the kernels from the cob and after passage of the cob through the scraping head move inwards, as hereinbefore pointed out. From the rolls 23, the cobs with the kernels cut therefrom are discharged from the housing 16 via the outlet 35 in the rear wall 29. If it is desired to adjust the knives 89 to the rotary cutting heat 18 for cream style cutting, it is only necessary to shift downwards to the proper extent the abutment screw 167 at the distal end of the arm 178. Downward movement of this screw, as heretofore pointed out, operates to move inwards the track 182 for the pads 199 of the bell cranks 196 and moves the knives outwards in closer spaced relation with respect to the inner peripheries of the feed rolls 21. Should it be desired to inspect the interior of the housing 16 and remove either the cutting head 18 or the scraping head 19 it is only necessary to swing the I-bolt 42 inwardly out of engagement with the lug 43 and then swing upwardly and outwardly the upper section 40 of the housing 16.

The herein described green corn cutting apparatus effectively and efficiently fulfills its intended purpose. Due to the fact that the feed rolls in front of the rotary cutting head embody and require no pointed spurs none of the kernels are mutilated prior to cutting and hence there is no wastage. By reason of the fact that the knives of the cutting head are of the floating variety and close by centrifugal force and not by springs or controlling devices sticking or jamming of the knives is eliminated and it is not necessary periodically to stop the apparatus for cleaning purposes. Because the means for feeding the ears successively and longitudinally to and through the cutting head 18 consists of two pairs of power driven feed rolls and such rolls are spurless the ears in transit from the endless conveyor to the cutting head are caused to travel parallelly to the axis of the cutting head and are free to center themselves with respect to the opening in the head.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A green corn cutting apparatus comprising in combination a supporting structure, a rotary power driven cutting head mounted on the structure and having a central opening for the passage therethrough of the ears of corn to be cut, a kernel cutting knife carried by the head for rotation therewith and mounted adjacent the opening and to move inwardly and outwardly, means for feeding said ears successively and longitudinally through the opening for cutting of the kernels by the knife, including a pair of opposed power driven spurless feed rolls in front of the head, adapted to engage the ears and have the latter pass therebetween and mounted and arranged so that during passage of each ear therebetween they are moved and held apart and after passage of each ear therefrom they move toward one another, and means for moving the knife outwardly to an ear receiving and kernel cutting position controlled by outward movement of said spurless feed rolls as the result of initial passage of an ear therebetween.

2. A green corn cutting apparatus comprising in combination a supporting structure, a cutting head mounted on the structure to rotate about the center thereof and having a central opening for the passage therethrough of the ears to be cut, a set of kernel cutting knives arranged in an annular series on and carried for rotation by the head and mounted adjacent the opening and to move conjointly inwardly and outwardly, means for feeding said ears successively and longitudinally through the opening for cutting of the kernels by the knives, including a pair of opposed rotary spurless feed rolls in front of the head, adapted to have the ears pass therebetween and mounted and arranged so that they are moved and held apart during passage of each ear therebetween and moved toward one another after passage of each ear therefrom, means for moving the knives outwardly to an ear receiving and kernel cutting position controlled by movement of said spurless feed rolls away from one another as the result of initial passage of an ear therebetween, and means for conjointly rotating the head and the rolls.

3. A green corn cutting apparatus comprising in combination a supporting structure, a cutting head mounted on the structure to rotate about the center thereof and having a central opening for the passage therethrough of the ears to be cut, a kernel cutting knife positioned on the head adjacent to the opening and pivotally mounted to swing inwardly and outwardly, a weight applied to the knife in such manner that in response to the action of centrifugal force during rotation of the head it operates to urge the knife inwardly and constituting the sole means for so urging said knife, means for feeding said ears successively and longitudinally toward and through the opening for cutting of the kernels by the knife, an element directly in front of the opening in the head and independent of said head adapted to have the ears engage and pass by it and mounted and designed so that during passing of an ear by it it is moved outwards and after passage of each ear past it it moves inwards, means whereby the knife is moved outwards to an ear receiving and kernel cutting position in response to outward movement of the element as the result of passing of an ear by it and is released for inward movement by the weight after passage of the ear by the element, and means for conjointly driving the cutting head and feed means.

4. A green corn cutting apparatus comprising in combination a supporting structure, a rotary power driven cutting head mounted on the structure to rotate about the center thereof and having an opening for the passage therethrough of the ears to be cut, a plurality of kernel cutting knives mounted in an annular series on the head adjacent to the opening and to swing conjointly to and from one another and having weights applied thereto so as to urge them inwardly into a closed position in response to the action of centrifugal force on said weights during rotation of the head, means for feeding said ears successively and longitudinally through the opening for cutting of the kernels by the knives including a pair of opposed power driven spurless feed rolls in front of the head adapted to have the ears pass therebetween and mounted and designed so that during passage of each ear therebetween they are moved and held apart and after passage of each ear therefrom they move toward one another, and means whereby the knives are conjointly moved outwardly to an ear receiving and kernel cutting position in response to outward movement of the feed rolls as the result of the passage of an ear therebetween and are released for inward movement by the weights upon movement of the rolls toward one another as the result of passage of the ear therefrom.

5. A green corn cutting apparatus comprising in combination a supporting structure, a rotary power driven cutting head mounted on the structure to rotate about the center thereof and having an opening for the passage therethrough of the ears to be cut, a plurality of bevel edged kernel cutting knives mounted in an annular series on the head adjacent to the opening and to swing conjointly inwardly and outwardly, means for feeding said ears successively and longitudinally through the opening for cutting of the kernels by the knives including a pair of opposed power driven feed rolls in front and independent of the head adapted to have the ears pass therebetween and mounted and designed so that during passage of each ear therebetween they are moved and held apart a distance corresponding to the width of such ear and after passage of the ear therefrom they move toward one another, and means for moving the knives outwards to an ear receiving and kernel cutting position in response and conformably to outward movement of the feed rolls as a result of the passage of an ear between the latter including a lost motion connection whereby the knives are permitted to move further outwards independently of the rolls while an ear of corn is being cut and at the same time is between said rolls.

6. A green corn cutting apparatus comprising in combination a supporting structure, a rotary power driven cutting head mounted on the structure to rotate about the center thereof and having a central opening for the passage therethrough of the ears to be cut, a plurality of bevel edged kernel cutting knives mounted in an annular series on the head adjacent to the opening and to swing conjointly to and from one another and having weights applied thereto in such manner that they are urged inwardly into a closed position in response to the action of centrifugal force on said weights during drive of the head, means for feeding said ears successively and longitudinally through the opening for cutting of the kernels by the knives including a pair of opposed power driven spurless feed rolls disposed in front of the head and with the peripheries thereof in the path of travel of the ears, adapted to have the ears engage and pass between them and mounted and arranged so that during passage of an ear therebetween they are moved and held apart a distance corresponding to the width of such ear and after passage of the ear therefrom they move toward one another, and means whereby the knives are conjointly moved outwardly to an ear receiving and kernel cutting position in response and conformably to outward movement of the feed rolls as the result of the passage of an ear therebetween and are released for inward movement by the weights upon movement of the rolls toward one another as the result of passage of the ears therefrom, including a lost motion connection for permitting the knives to move further outwards independently of the feed rolls while an ear of corn is being cut and at the same time is between the rolls.

7. A green corn cutting apparatus comprising in combination a supporting structure, a rotary power driven cutting head mounted on the structure to rotate about the center thereof and having an opening for the passage therethrough of the ears to be cut, a plurality of kernel cutting knives positioned in an annular series on the head adjacent to the opening and mounted to rotate with the head and to swing to and from one another, a ring mounted on the head for rotation relatively thereto and having lug and slot connections between it and the knives whereby when the ring is rotated in one direction relatively to the head the knives are caused conjointly to move outwards into an open position, power driven means for feeding said ears successively and longitudinally toward the opening for cutting of the kernels by the knives, an element directly in front of the opening in the head adapted to have the ears pass successively by it and mounted and arranged so that during passage of an ear thereby it is moved outwards and after passage of each ear past it it moves inwards, and means for moving the knives outwards to an ear receiving and kernel cutting position in response to outward movement of the element as the result of passing of an ear thereby including an annular track mounted adjacent, and to move to and from, the head, an operating connection between the track and the element whereby the track is caused to move axially in one direction when the element is moved outwards, and a bell crank type member mounted on and rotatable with the head, having an arm in engagement with and rotatable about the track and an arm in connected relation with the ring, and adapted in response to movement in one direction to rotate the ring in said one direction.

8. A green corn cutting apparatus comprising in combination, a supporting structure, a rotary power driven cutting head mounted on the structure to rotate about the center thereof and having an opening for the passage therethrough of the ears to be cut, a plurality of kernel cutting knives positioned in an annular series on the head adjacent the opening and mounted to rotate with the head and to swing to and from one another, a ring mounted on the head for rotation relatively thereto and having lug and slot connections between it and the knives whereby when the ring is rotated in one direction relatively to the head the knives are caused conjointly to move outwards into an open position, power driven means for feeding said ears successively and longitudinally toward the opening for cutting of the kernels by the knives, an element directly in front of the opening in the head adapted to have the ears pass successively by it and mounted and arranged so that during passage of an ear thereby it is moved outwards and after passage of each ear past it it moves inwards, means for moving the knives outwards to an ear receiving and kernel cutting position in response to outward movement of the element as the result of passing of an ear thereby including an annular track mounted adjacent, and to move to and from, the head, an operating connection between the track and the element whereby the track is caused to move towards the head in response to outward movement of the element, and a bell crank pivotally mounted on and rotatable with the head, having an arm in engagement with and rotatable about the track and an arm in connected relation with the ring, and adapted in response to movement of the track toward the head to rotate the ring in said one direction, means for moving the track away from the head upon inward movement of the element, and means for swinging the knives toward one another into a closed position and rotating the ring in the opposite direction relatively to the head upon movement of the track away from the head by the last mentioned means and discharge of an ear of corn from the knives.

9. A green corn cutting apparatus comprising in combination, a supporting structure, a rotary power driven cutting head mounted on the structure to rotate about the center thereof and having an opening for the passage therethrough of the ears to be cut, a plurality of kernel cutting knives positioned in an annular series on the head adjacent to the opening and mounted to rotate with the head and to swing to and from one another, a ring mounted on the head for rotation relatively thereto and having lug and slot connections between it and the knives whereby when the ring is rotated in one direction relatively to the head the knives are caused conjointly to move outwards into an open position, power driven means for feeding the ears successively and longitudinally through the opening for cutting of the kernels by the knives including a pair of opposed power driven feed rolls directly in front of the head adapted to have the ears pass therebetween and mounted and designed so that during passage of each ear therebetween they are moved and held apart a distance corresponding to the width of such ear and after passage of the ear therefrom they move toward one another, means for moving the knives outwards to an ear receiving and kernel cutting position in response to outward movement of the rolls as the result of an ear passing therebetween comprising an annular track mounted adjacent, and to move to and from, the head an operating connection between the track and the rolls whereby the track is caused to move towards the head in response to outward movement of said rolls, a plurality of bell cranks pivotally mounted on and rotatable with the head, having arms in engagement with and rotatable about the track and arms in connected relation with the ring, and adapted in response to movement of the track toward the head to rotate the ring in said one direction, spring means for moving the track away from the head upon inward movement of the rolls, and means for swinging the knives toward one another into a closed position and rotating the ring in the opposite direction relatively to the head upon movement of the track away from the head by said spring means and discharge of an ear of corn from the knives.

10. A green corn cutting apparatus comprising in combination, a supporting structure, a rotary power driven cutting head mounted on the structure to rotate about the center thereof and having an opening for the passage therethrough of the ears to be cut, a plurality of kernel cutting bevel edged knives positioned in an annular series on the head adjacent to the opening and mounted to rotate with the head and to swing to and from one another, a ring mounted on the head for rotation relatively thereto and having lug and slot connections between it and the knives whereby when the ring is rotated in one direction relatively to the head the knives are caused conjointly to move outwards into an open position, power driven means for feeding said ears successively and longitudinally toward the opening for cutting of the kernels by the knives, an element directly in front of the opening in the head adapted to have the ears pass successively by it and mounted and arranged so that during passage of an ear thereby it is moved outwards and after passage of each ear past it it moves inwards, means for moving the knives outwards to an ear receiving and kernel cutting position in response to outward movement of the element as the result of passing of an ear thereby including an annular track mounted adjacent, and to move to and from, the head an operating connection between the track and the element whereby the track is caused to move toward the head in response to outward movement of the element, and a bell crank pivotally mounted on and rotatable with the head, having an arm in engagement with and rotatable about the track and an arm fitting loosely in a slot in the ring, and adapted in response to movement of the track toward the head to rotate the ring in said one direction.

11. A green corn cutting apparatus comprising in combination a supporting structure, a rotary power driven cutting head mounted on the structure to rotate about the center thereof and having an opening for the passage therethrough of the ears to be cut, a plurality of kernel cutting bevel edged knives pivotally mounted in an annular series adjacent to the opening and to swing inwardly and outwardly, and having weights applied thereto so as to urge them inwardly in response to centrifugal force during rotation of the head, a ring mounted on the head for rotation relatively thereto and having lug and slot connections between it and the knives whereby when the ring is rotated in one direction relatively to the head the knives are caused conjointly to move outwards into an open position, means for feeding said ears successively and longitudinally toward the opening for cutting of the kernels by the knives, including a pair of opposed power driven spurless rolls in front of the head adapted to have the ears pass therebetween and mounted and designed so that during passage of each ear therebetween they are moved and held apart and after passage of each ear therefrom they move toward one another, means for moving the knives outwards to an ear receiving and kernel cutting position in response to outward movement of the rolls as the result of passing of an ear therebetween including an annular track mounted adjacent, and to move to and from, the head, an operating connection between the track and the rolls whereby the track is caused to move towards the head when the rolls move outwards, and a plurality of bell cranks pivotally mounted on and rotatable with the head, having arms in engagement with and rotatable about the track and arms in loosely connected relation with the ring, and adapted in response to movement of the track toward the head to rotate the ring in said one direction, and spring means for shifting the track away from the head upon inward movement of the rolls so as to release the knives for inward movement by the weights after discharge of an ear therefrom.

12. A green corn cutting apparatus comprising in combination a supporting structure, a rotary power driven cutting head mounted on the structure to rotate about the center thereof and having an opening for the passage therethrough of the ears to be cut, a plurality of kernel cutting knives positioned in an annular series on the head adjacent to the opening and mounted to rotate with the head and to swing to and from one another, a ring mounted on the head for rotation relatively thereto and having lug and slot connections between it and the knives whereby when the ring is rotated in one direction relatively to the head the knives are caused conjointly to move outwards into an open position, power driven means for feeding said ears successively and longitudinally toward the opening for cutting of the kernels by the knives, an element directly in front of the opening in the head adapted to have the ears pass successively by it and mounted and arranged so that during passage of an ear thereby it is moved outwards and after passage of each ear past it it moves inwards, and means for moving the knives outwards to an ear receiving and kernel cutting position in response to outward movement of the element as the result of passing of an ear thereby including an annular track mounted adjacent, and to move to and from the head, an operating connection between the track and the element whereby the track is caused to move axially in one direction when the element is moved outwards, and a bell crank type member mounted on and rotatable with the head, having an arm in engagement with and rotatable about the track and an arm in connected relation with the ring, and adapted in response to movement of the track in said one direction to rotate the ring in said one direction, said knife moving means including as a part of the operating connection thereof an adjustment whereby the relative position of the knives may be varied with respect to the element for depth of cut changing purposes.

13. A green corn cutting apparatus comprising in combination a supporting structure, a rotary power driven cutting head mounted on the structure to rotate about the center thereof and having a central opening for the passage therethrough of the ears of corn to be cut, a plurality of bevel edged kernel cutting knives positioned in an annular series on the head and adjacent the opening and arranged to swing conjointly inwardly and outwardly, means for feeding said ears successively and longitudinally through the openings for cutting the kernels by the knives including a pair of opposed power driven spurless rolls disposed in front of the head and with the peripheries thereof in the path of travel of the ears, adapted to have the ears pass therebetween and mounted and arranged so that during passage of each ear therebetween they are moved and held apart a distance equal to the width of the ear and after passage of each ear therefrom they move toward one another, and means for moving the knives outwardly to an ear receiving and kernel cutting position in response and proportionately to outward movement of the feed rolls as the result of the passage of an ear therebetween, including a lost motion connection whereby the knives are permitted to move further outwards independently of the rolls while an ear of corn is being cut and at the same time is between said rolls, and also, including an adjustment independent of any of the parts of the head and between said connection and the rolls, whereby the normal relative position of the knives may be varied with respect to said rolls.

14. A green corn cutting apparatus comprising in combination a supporting structure, a power driven cutting head mounted on the structure for rotation about the center thereof and having a central opening for the passage therethrough of the ears of corn to be cut and a substantially radially movable kernel cutting knife with a bevel edged cutting part in the opening and substantially parallel to the axis of rotation, and also having an annular saucer shaped wall around said cutting part and outwardly of said central opening adapted during rotation of kernels by the head and cutting of the knife to have the cut kernels strike thereagainst and travel outwardly thereover, and sharply curved from the inner to the outer margin thereof so that the speed of the cut kernels traveling outwardly thereagainst is materially retarded, and power driven means for feeding said ears successively and longitudinally through the opening for cutting of the kernels by the knife.

15. A green corn cutting apparatus comprising in combination a supporting structure, a power driven cutting head mounted on the structure to rotate about the center thereof and having a central opening for the passage therethrough of the ears of corn to be cut and an annular series of substantially radially movable kernel cutting knives with bevel edged cutting parts in the opening and substantially parallel to the axis of rotation, and also having an annular saucer shaped wall around the cutting parts of the knives and outwardly of the opening, adapted during rotation of the head and cutting of the kernels by the knives to have the cut kernels strike thereagainst and move thereover and curved substantially quadrantally from the inner to the outer margin thereof so as materially to retard the speed of the cut kernels traveling outwardly thereagainst, and means for feeding said ears successively and longitudinally through said opening.

16. A green corn cutting apparatus comprising in combination a supporting structure, a rotary power driven corn cutting head mounted on the structure and having a central opening for the passage therethrough of the ears of corn to be cut and a substantially radially movable kernel cutting knife in the opening, means for feeding said ears successively and longitudinally through the opening for cutting of the kernels by the knife comprising an endless conveyor in front of the head and in longitudinal alignment with the opening, a pair of oppositely disposed separable small diameter spurless feed rolls directly in front of the opening and a pair of oppositely disposed separable large diameter power driven spurless feed rolls between the conveyor and the small diameter rolls for feeding the ears from the former to and between the latter for passage through the head opening, and means for moving the knife outwardly to an ear receiving and kernel cutting position controlled by outward movement of the small diameter feed rolls.

17. A green corn cutting apparatus comprising a supporting structure, a rotary power driven cutting head mounted on the structure for rotation about the center thereof and having a central opening for the passage therethrough of the ears of corn to be cut and a kernel cutting knife in said opening, means for feeding said ears successively and longitudinally through the opening for cutting of the kernels by the knife, including an endless conveyor in front of the head and substantially longitudinally aligned with the opening, a pair of oppositely disposed separable power driven small diameter feed rolls directly in front of the opening and with the peripheries thereof in the path of travel of the ears, and a pair of oppositely disposed separable power driven large diameter feed rolls positioned between the conveyor and the small diameter feed rolls and with the peripheries thereof in said path of travel of the ears and operative to feed the ears of corn from the conveyor to and between the small diameter rolls for passage through the head, and an operating connection between the two pairs of rolls whereby the small diameter feed rolls are caused to move apart into an ear receiving position in response to opening or separation of the large diameter feed rolls as the result of passage of an ear therebetween.

18. In a green corn cutting apparatus of the character described the combination of a supporting structure, a rotary power driven cutting head mounted on the structure for rotation about the center thereof and having a central opening for the passage therethrough of the ears of corn to be cut and in addition a substantially radially movable kernel cutting knife in the opening, means for feeding said ears successively and longitudinally toward the opening for cutting of the kernels by the knife including a pair of oppositely disposed separable power driven feed rolls in front of the head and with the peripheries thereof in the path of travel of the ears, an element between the rolls and the head opening adapted to have the ears engage and pass by it as they travel from the rolls through the opening and mounted and designed so that during passing of an ear by it it is moved outwards and after passage of each ear past it it moves inwards, means for moving the knife outwardly to an ear receiving and kernel cutting position in response to outward movement of said element as the result of passage of an ear by it, and an operating connection between the rolls and said element whereby said element is caused to move outwards to a limited extent in response to opening or separation of the feed rolls as a result of passage of an ear therebetween.

19. In a green corn cutting apparatus of the character described, the combination of a supporting structure, a rotary power driven cutting head mounted on the structure to rotate about the center thereof and having a central opening for the passage therethrough of the ears of corn to be cut and in addition an annular series of substantially radially movable kernel cutting knives in the opening, means for feeding the ears successively and longitudinally toward the opening for cutting of the kernels by the knives including a pair of oppositely disposed separable power driven small diameter feed rolls directly in front of the knives and with the peripheries thereof in the path of travel of the ears, and a pair of oppositely disposed separable power driven large diameter feed rolls disposed in front of the small diameter rolls and with the peripheries thereof also in said path of travel of the ears and adapted to feed the ears to and between said small diameter rolls for passage through the head, means for moving the knives outwardly to an ear receiving position in response to separation or opening of the small diameter feed rolls as the result of the passage of an ear therebetween, and an operating connection between the two pairs of rolls whereby said small diameter feed rolls are caused to move apart to a limited extent in response to opening or separation of the large diameter feed rolls as the result of the passage of an ear therebetween.

20. A green corn cutting apparatus of the character described, comprising in combination a supporting structure, a rotary power driven cutting head mounted on the structure to rotate about the center thereof and having a central opening for the passage therethrough of the ears of corn to be cut and a kernel cutting knife in said opening, means for feeding said ears successively and longitudinally through the opening for cutting of the kernels by the knife including a pair of oppositely disposed separable power driven feed rolls positioned directly in front of the head and having a pair of coacting bell cranks associated therewith for causing them to separate and move inwards in unison, and a second pair of oppositely disposed separable power driven feed rolls positioned in front of the first mentioned rolls having a pair of coacting bell cranks associated therewith for causing them to separate and move inwardly in unison and adapted to feed the ears to and between the first mentioned rolls for passage through the head, and means consisting of a pair of coacting levers between one of the bell cranks associated with said first mentioned feed rolls and one of the bell cranks associated with the second pair of feed rolls for automatically and positively opening or separating said first mentioned feed rolls to a limited extent for corn receiving purposes in response to opening of said second mentioned feed rolls as the result of passage of an ear of corn therebetween.

21. A green corn cutting apparatus comprising in combination, an elongated horizontally extending housing structure having at one end thereof an inlet for the corn to be cut and at its other end an outlet for the cobs and consisting of a lower section and a complemental upper section removably secured to the lower section, a rotary ring type cutting head in the housing, means for rotatably supporting said head comprising rollers mounted in the lower housing section so that they are adjustable to and from the axis of the head and a coacting roller carried by the upper section so that it is adjustable to and from said axis and adapted upon removal of the upper section to free the head for purposes of removal, power driven gearing independent of the rollers for driving the head, and means for feeding said corn to be cut into the housing and through the head and discharging the cobs through the outlet.

22. A green corn cutting apparatus comprising in combination an elongated horizontally extending housing structure having at one end thereof an inlet for the corn to be cut and at its other end an outlet for the cobs, and consisting of a lower section and a complemental upper section hingedly connected to said lower section so that it may be swung away from the latter into an inoperative position, a rotary ring type cutting head in the housing adjacent said one end thereof, a rotary scraping head disposed in the housing between the cutting head and said other end of the housing, means for rotatably supporting the two heads comprising rollers mounted in the lower section so that they are adjustable to and from the common axis of the two heads and coacting rollers carried by the upper section so that they are adjustable to and from said axis and adapted upon swinging of said upper section into its inoperative position to free the two heads for purposes of removal, power driven means independent of the rollers for conjointly driving the two heads, and means for feeding said ears through the inlet and the cutting head and thence through the scraping head and out the outlet.

23. A green corn cutting apparatus comprising in combination a supporting structure, a rotary power driven cutting head mounted on the structure and having a central opening for the passage therethrough of the ears of corn to be cut and a substantially radially movable kernel cutting knife in the opening, and means for feeding the said ears successively and longitudinally through the opening for cutting of the kernels by the knife comprising an endless conveyor in front of the head and in longitudinal alignment with the opening, a pair of oppositely disposed separable feed rolls directly in front of the opening, having concave peripheries and embodying spring means for urging them together, and a pair of oppositely disposed separable spurless feed rolls between the conveyor and the first mentioned rolls, provided with concave peripheries and also spring means for urging them together and arranged and positioned so that they operate to feed the ears from the conveyor to and between said first mentioned feed rolls and in addition coact with the latter to maintain the ears in substantially truly centered relation with the opening in the cutting head.

24. A green corn cutting apparatus comprising in combination a supporting structure, a rotary power driven cutting head mounted on the structure and having a central opening for the passage therethrough of the ears of corn to be cut and a substantially radially movable kernel cutting knife in the opening, means for feeding cutting knife in the opening, means for feeding the said ears successively and longitudinally through the opening for cutting of the kernels by the knife comprising an endless conveyor in front of the head and in longitudinal alignment with the opening, a pair of oppositely disposed separable spurless feed rolls positioned directly in front of the opening and having concave peripheries and in addition spring means for urging them together, and a pair of oppositely disposed separable spurless feed rolls between the conveyor and the first mentioned rolls having concave peripheries and in addition spring means for urging them together and arranged and positioned so that they operate to feed the ears from the conveyor to and between the first mentioned feed rolls and coact with the latter to maintain the ears in substantially truly centered relation with the opening in the cutting head, and means for moving the knife outwardly to an ear receiving and kernel cutting position controlled by outward movement of said first mentioned feed rolls.

25. In a green corn cutting apparatus of the character described the combination of a supporting structure, a rotary power driven cutting head mounted on the structure for rotation about the center thereof and having a central opening for the passage therethrough of the ears of corn to be cut and a kernel cutting knife in said opening, means for feeding said ears successively and longitudinally through the opening for cutting of the kernels by the knives, including an endless conveyor in front of the head and substantially longitudinally aligned with the opening, a pair of oppositely disposed separable power driven spurless feed rolls directly in front of the opening and a pair of oppositely disposed separable power driven spurless feed rolls between the conveyor and said first mentioned feed rolls for feeding the ears of corn from the former to and through the latter for passage through the head, and an operating connection between the two pairs of rolls whereby the first mentioned feed rolls are caused to move apart into an ear receiving position in response to opening or separation of the second mentioned feed rolls as the result of passage of an ear therebetween.

26. A green corn cutting apparatus comprising a supporting structure, a rotary power driven head mounted on the structure to rotate about the center thereof and having a central opening for the passage therethrough of the ears to be cut, a plurality of kernel cutting knives positioned in an annular series on the head and adjacent the opening and arranged and pivotally mounted to swing conjointly to and from one another to a limited extent, weights applied to the knives in such manner that in response to the action of centrifugal force during rotation of the head they urge the knives inwards, and constituting the sole means for so urging said knives, and power driven means for feeding said ears successively and longitudinally through the opening for cutting of the kernels by the knives.

JOHN SCHMIDT.